US012634013B2

(12) United States Patent
Yang et al.

(10) Patent No.: US 12,634,013 B2
(45) Date of Patent: May 19, 2026

(54) OPTICAL MODULE

(71) Applicant: HISENSE BROADBAND MULTIMEDIA TECHNOLOGIES CO., LTD., Qingdao (CN)

(72) Inventors: Liu Yang, Qingdao (CN); Qiang Zhang, Qingdao (CN); Shihai Yang, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 247 days.

(21) Appl. No.: 18/502,853

(22) Filed: Nov. 6, 2023

(65) Prior Publication Data

US 2024/0072903 A1 Feb. 29, 2024

Related U.S. Application Data

(63) Continuation of application No. 17/491,456, filed on Sep. 30, 2021, now Pat. No. 11,848,707, which is a (Continued)

(30) Foreign Application Priority Data

Feb. 25, 2020 (CN) ........................ 202010115310.3
Mar. 6, 2020 (CN) ........................ 202010153331.4

(Continued)

(51) Int. Cl.
*H04B 10/516* (2013.01)
*G02F 1/21* (2006.01)

(Continued)

(52) U.S. Cl.
CPC .......... *H04B 10/516* (2013.01); *G02F 1/212* (2021.01); *H04B 10/25* (2013.01); *H04B 10/66* (2013.01)

(58) Field of Classification Search
CPC ...... H04B 10/516; H04B 10/25; H04B 10/66; G02F 1/212
See application file for complete search history.

(56) References Cited

U.S. PATENT DOCUMENTS

| | | | | |
|---|---|---|---|---|
| 6,181,456 | B1 | 1/2001 | McBrien et al. | |
| 6,396,605 | B1 * | 5/2002 | Heflinger | H04B 10/60 398/140 |

(Continued)

FOREIGN PATENT DOCUMENTS

| | | | |
|---|---|---|---|
| CN | 1302390 | A | 7/2001 |
| CN | 110632718 | A | 7/2001 |

(Continued)

OTHER PUBLICATIONS

International Search Report and Written Opinion dated Apr. 30, 2021 in corresponding International Application No. PCT/CN2021/074951, translated, 14 pages.

(Continued)

*Primary Examiner* — Pranesh K Barua
(74) *Attorney, Agent, or Firm* — Cozen O'Connor

(57) ABSTRACT

An optical module includes a shell, a circuit board, a light source and a silicon optical chip. The silicon optical chip includes a modulator. The circuit board includes a first sampling circuit configured to generate a first sampling signal, a second sampling circuit configured to generate a second sampling signal, and a processing circuit. The first sampling circuit is connected in series with the second sampling circuit, and a connection terminal of the first sampling circuit and the second sampling circuit is located between a first photodetector of the first sampling circuit and a second photodetector of the second sampling circuit. The processing circuit is configured to send a driving signal to the modulator according to a signal transmitted at the connection terminal of the first sampling circuit and the (Continued)

second sampling circuit, so as to control heating of the modulator or change phase of light in the modulator.

17 Claims, 9 Drawing Sheets

Related U.S. Application Data continuation-in-part of application No. PCT/CN2021/074951, filed on Feb. 2, 2021.

(30) Foreign Application Priority Data

Jul. 31, 2020 (CN) ......................... 202010759086.1
Jul. 31, 2020 (CN) ......................... 202021561951.3

(51) Int. Cl.
*H04B 10/25* (2013.01)
*H04B 10/66* (2013.01)

(56) References Cited

U.S. PATENT DOCUMENTS 9,835,928 B1 12/2017 Shen et al.
10,742,324 B1 * 8/2020 Padmaraju ........... H04B 10/541
2006/0133712 A1 6/2006 Jang et al.
2007/0058988 A1 * 3/2007 Yonenaga .............. H04B 10/66 398/186
2011/0229070 A1 9/2011 Doi et al.
2013/0011093 A1 1/2013 Goh et al.
2013/0216232 A1 * 8/2013 Zanoni .................. H04B 10/65 398/115
2016/0363835 A1 12/2016 Nagarajan
2019/0049756 A1 2/2019 Miyazaki et al.
2019/0072833 A1 3/2019 Nejadriahi et al.
2019/0212510 A1 7/2019 Zhang et al.
2019/0324298 A1 10/2019 Dayel et al.
2019/0379453 A1 12/2019 Toda et al.
2020/0200975 A1 6/2020 Ma et al.
2021/0211202 A1 * 7/2021 Tsai ...................... G02F 1/0123
2023/0046152 A1 * 2/2023 Grote ................. G02B 6/29349

FOREIGN PATENT DOCUMENTS

CN 101026417 A 8/2007
CN 101364841 A 2/2009
CN 102224444 A 10/2011
CN 103346842 A 10/2013
CN 107171736 A 9/2017
CN 107430296 A 12/2017
CN 107994950 A 5/2018
CN 110291457 A 9/2019
CN 110971304 A 4/2020
JP 2006003619 A 1/2006
JP 2013205771 A 10/2013
JP 2017083607 A 5/2017

OTHER PUBLICATIONS

Non-Final Office Action dated Apr. 25, 2023 in parent U.S. Appl. No. 17/491,456, 29 pages.
Notice of Allowance dated Aug. 4, 2023 in parent U.S. Appl. No. 17/491,456, 5 pages.
Chinese Notification of the First Office Action dated Mar. 3, 2022 in corresponding Chinese Application No. 202010115310.3, translated, 13 pages.
Chinese First Office Action dated Jun. 6, 2022 in corresponding Chinese Application No. 202010153331.4, translated, 12 pages.
Chinese First Office Action dated Oct. 19, 2022 in corresponding Chinese Application No. 202010759086.1, translated, 14 pages.
"Research on 40 Gpbs DPSK Optical Tranponder," China Excellent Master's Thesis Full Text Database Information Technology Series, May 15, 2012, English Abstract, 87 pages.
Bui et al. "Instrumentation system for determination and compensation of electro-optic modulator transfer function drift," Measurement Science and Technology, vol. 22, Feb. 7, 2012, 13 pages.

* cited by examiner

OPTICAL MODULE

CROSS-REFERENCE TO RELATED APPLICATIONS

This application is a continuation application of U.S. patent application Ser. No. 17/491,456, filed on Sep. 30, 2021, pending, which is a Continuation-in-Part of International Patent Application No. PCT/CN2021/074951 filed on Feb. 2, 2021, and claims priority to Chinese Patent Application No. 202010115310.3, filed on Feb. 25, 2020, Chinese Patent Application No. 202010153331.4, filed on Mar. 6, 2020, Chinese Patent Application No. 202010759086.1, filed on Jul. 31, 2020, and Chinese Patent Application No. 202021561951.3, filed on Jul. 31, 2020, which are incorporated herein by reference in their entireties.

TECHNICAL FIELD

The present disclosure relates to the field of optical communication technologies, and in particular, to an optical module.

BACKGROUND

Optical communication technologies are used in new services and application modes such as cloud computing, mobile internet and video conferencing. In the optical communication, an optical module is a tool for achieving interconversion between an optical signal and an electrical signal, and is one of key components in an optical communication device.

SUMMARY

An optical module is provided. The optical module includes a shell, a circuit board, a light source and a silicon optical chip. The circuit board is disposed in the shell. The light source is electrically connected to the circuit board and is configured to emit light. The silicon optical chip is disposed on the circuit board and is electrically connected to the circuit board. The silicon optical chip includes a modulator, the modulator is configured to receive the light emitted by the light source and modulate the light into an optical signal, so as to output the optical signal to an outside of the optical module. The circuit board includes a first sampling circuit, a second sampling circuit and a processing circuit. The first sampling circuit is optically connected to a first monitoring optical port of the silicon optical chip and is configured to receive an optical signal transmitted through the first monitoring optical port and generate a first sampling signal according to the optical signal. The second sampling circuit is optically connected to a second monitoring optical port of the silicon optical chip and is configured to receive an optical signal transmitted through the second monitoring optical port and generate a second sampling signal according to the optical signal. The first sampling circuit is connected in series with the second sampling circuit, the first sampling circuit includes a first photodetector configured to generate a first photocurrent according to the optical signal received from the first monitoring optical port, the second sampling circuit includes a second photodetector configured to generate a second photocurrent according to the optical signal received from the second monitoring optical port, and a connection terminal of the first sampling circuit and the second sampling circuit is located between the first photodetector and the second photodetector. The processing circuit is connected to the first sampling circuit and the second sampling circuit and is configured to receive a signal transmitted at the connection terminal of the first sampling circuit and the second sampling circuit, and send a driving signal to the modulator according to a difference between an amplitude of the first sampling signal and an amplitude of the second sampling signal, so as to control heating of the modulator or change phase of the light in the modulator.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual dimensions of products, actual processes of methods and actual timings of signals involved in the embodiments of the present disclosure.

DETAILED DESCRIPTION

Figure 1A:
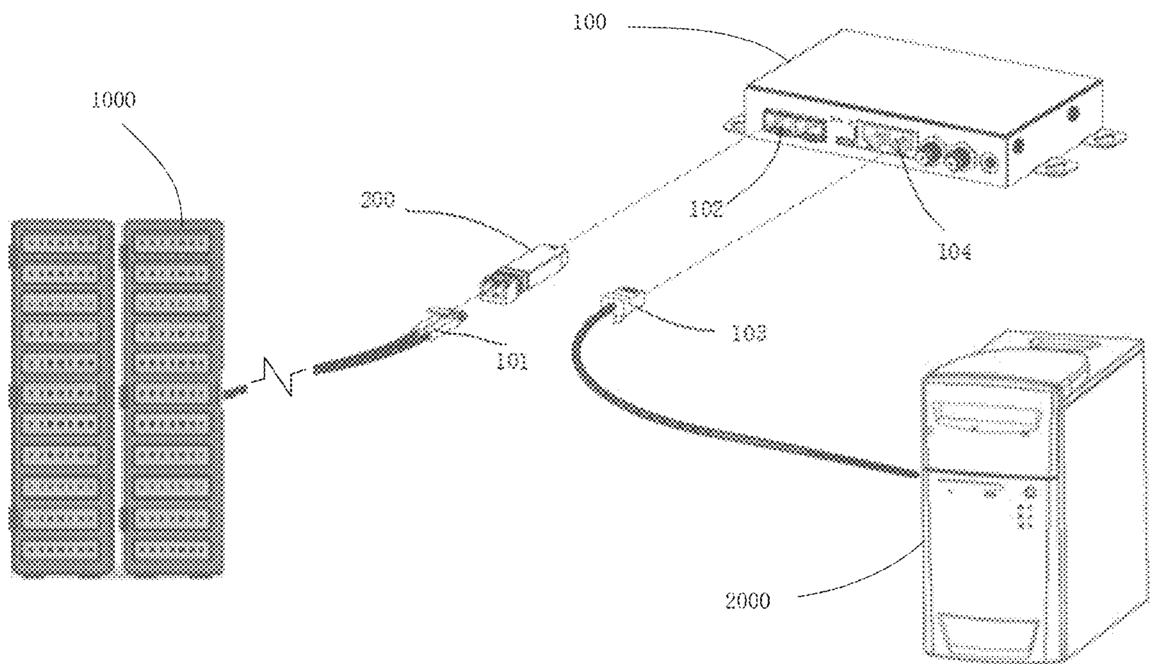
FIG. 1A is a schematic diagram of a connection relationship of an optical communication system, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term “comprise” and other forms thereof such as the third-person singular form “comprises” and the present participle form “comprising” are construed as being open and inclusive meaning, i.e., “including, but not limited to”.

In the description of the specification, the terms “one embodiment”, “some embodiments”, “exemplary embodiments”, “an example” or “some examples” and the like are intended to indicate that specific features, structures, materials, or characteristics related to the embodiment or example are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms “first” and “second” are used for descriptive purposes only, and are not to be construed as indicating or implying the relative importance or implicitly indicating the number of indicated technical features. Thus, features defined with “first” and “second” may explicitly or implicitly include one or more of the features. In the description of the embodiments of the present disclosure, the term “a plurality of” means two or more unless otherwise specified.

In the description of some embodiments, the terms “coupled” and “connected” and their extensions may be used. For example, the term “connected” may be used in the description of some embodiments to indicate that two or more components are in direct physical or electrical contact with each other. For another example, the term “coupled” may be used in the description of some embodiments to indicate that two or more components are in direct physical or electrical contact. However, the term “coupled” or “communicatively coupled” may also mean that two or more components are not in direct contact with each other, but still cooperate or interact with each other. The embodiments disclosed herein are not necessarily limited to the contents herein.

The phrase “at least one of A, B and C” has a same meaning as the phrase “at least one of A, B or C”, and they both include the following combinations of A, B and C: only A, only B, only C, a combination of A and B, a combination of A and C, a combination of B and C, and a combination of A, B and C.

The phrase “A and/or B” includes the following three combinations: only A, only B, and a combination of A and B.

The use of “adapted to” or “configured to” herein implies an open and inclusive expression that does not exclude devices adapted to or configured to perform additional tasks or steps.

The term “about”, “substantially” or “approximately” as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In optical communication technologies, an optical signal is used to carry information to be transmitted, and the optical signal carrying the information is transmitted to an information processing device such as a computer through an information transmission device such as an optical fiber or an optical waveguide, so as to achieve transmission of the information. The optical signal has a characteristic of passive transmission when being transmitted through the optical fiber or the optical waveguide, thus low-cost and low-loss information transmission may be achieved. In addition, a signal transmitted by the information transmission device such as the optical fiber or the optical waveguide is an optical signal, while a signal that can be recognized and processed by the information processing device such as a computer is an electrical signal. Therefore, in order to establish information connection between the information transmission device such as the optical fiber or the optical waveguide and the information processing device such as the computer, interconversion between the electrical signal and the optical signal needs to be achieved.

An optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of a data signal and grounding. The optical network terminal transmits the electrical signal to the information processing device such as the computer through a network cable or wireless fidelity (Wi-Fi).

Figure 1B:
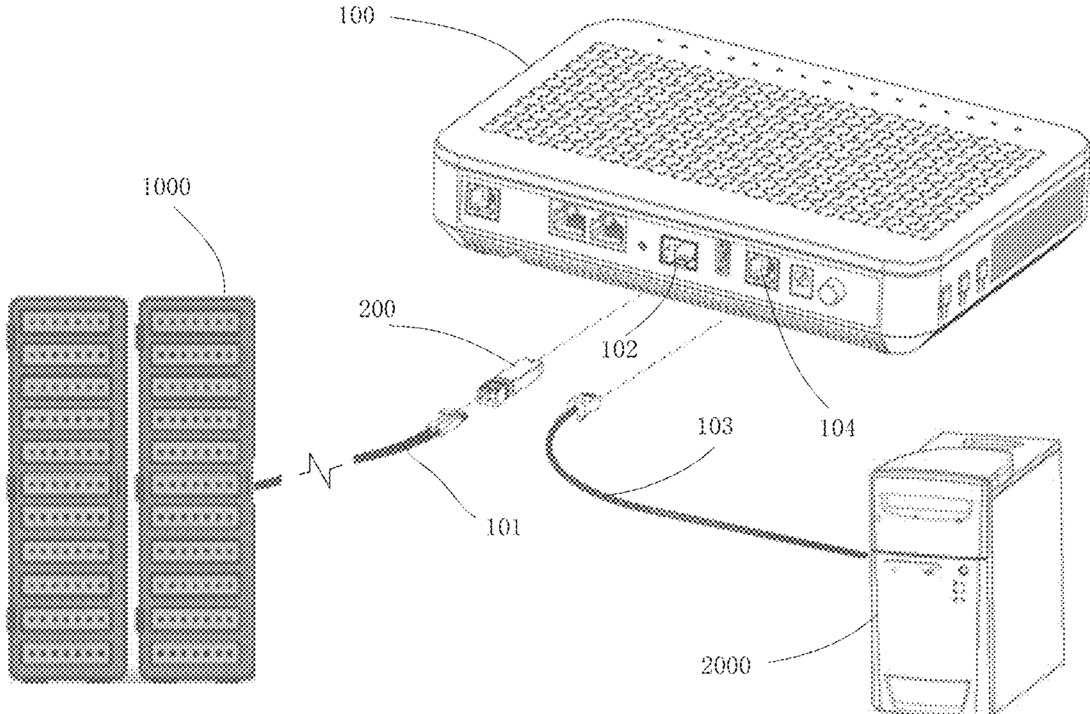
FIG. 1B is a schematic diagram of a connection relationship of another optical communication system, in accordance with some embodiments.

FIG. 1A is a schematic diagram of a connection relationship of an optical communication system in accordance with some embodiments, and FIG. 1B is a schematic diagram of a connection relationship of another optical communication system in accordance with some embodiments. As shown in FIGS. 1A and 1B, the optical communication system mainly includes a remote server 1000, a local information processing device 2000, an optical network terminal 100, an optical module 200, an optical fiber 101 and a network cable 103.

An end of the optical fiber 101 is connected to the remote server 1000, and another end thereof is connected to the optical network terminal 100 through the optical module 200. The optical fiber itself may support long-distance signal transmission, such as signal transmission of several kilometers (6 kilometers to 8 kilometers). Based on this, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

An end of the network cable 103 is connected to the local information processing device 2000, and another end thereof is connected to the optical network terminal 100. The local information processing device 2000 is at least one of the followings: a router, a switch, a computer, a mobile phone, a tablet computer, or a television.

A physical distance between the remote server 1000 and the optical network terminal 100 is greater than a physical distance between the local information processing apparatus 2000 and the optical network terminal 100. A connection between the local information processing device 2000 and the remote server 1000 is completed by the optical fiber 101 and the network cable 103, and a connection between the optical fiber 101 and the network cable 103 is completed by the optical module 200 and the optical network terminal 100.

The optical module 200 includes the optical port and the electrical port. The optical port is configured to be connected to the optical fiber 101, so that a bidirectional optical signal connection between the optical module 200 and the optical fiber 101 is established; and the electrical port is configured to access the optical network terminal 100, so that a bidirectional electrical signal connection between the optical module 200 and the optical network terminal 100 is established. Interconversion between the optical signal and the electrical signal is achieved by the optical module 200, so that a connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that the bidirectional electrical signal connection between the optical network terminal 100 and the network cable 103 is established. A connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
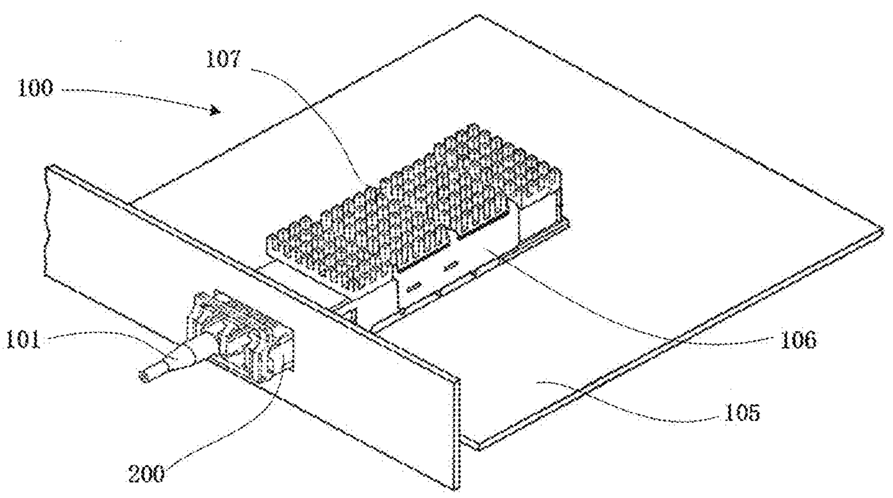
FIG. 2 is a structural diagram of an optical network terminal, in accordance with some embodiments.

FIG. 2 is a structural diagram of an optical network terminal, in accordance with some embodiments. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protrusions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector in the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
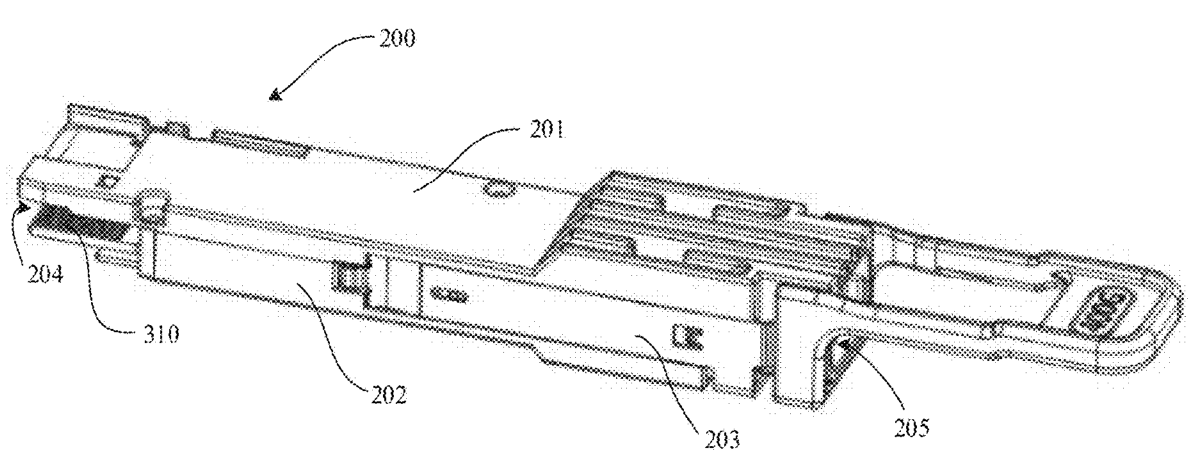
FIG. 3 is a structural diagram of an optical module, in accordance with some embodiments.
Figure 4:
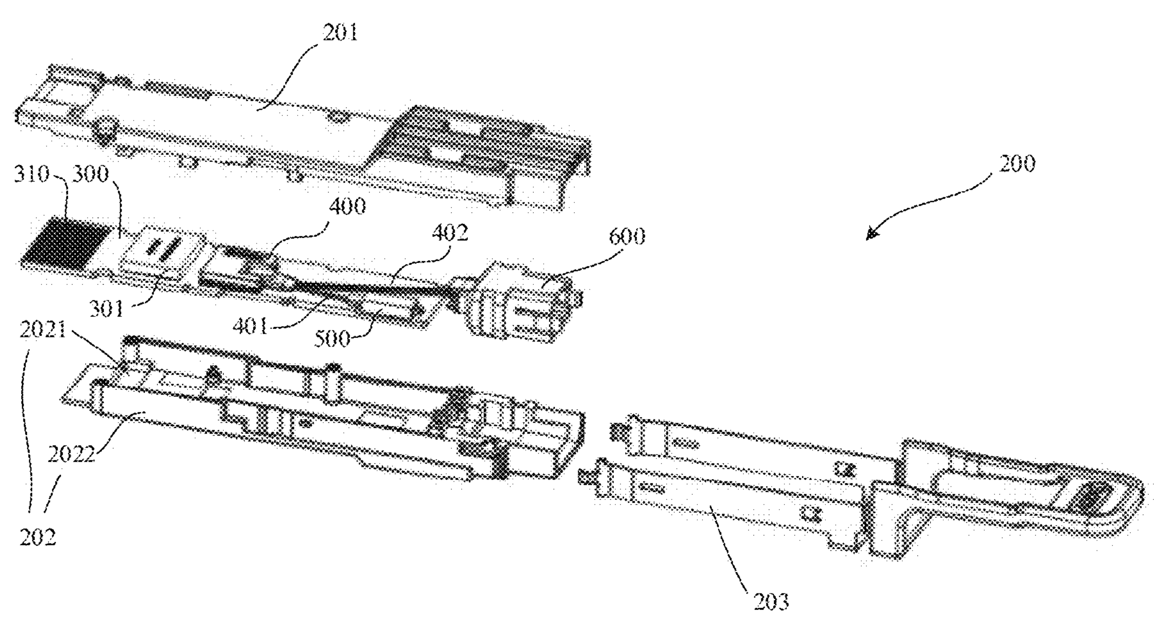
FIG. 4 is an exploded structural diagram of an optical module, in accordance with some embodiments.

FIG. 3 is a structural diagram of an optical module 200 in accordance with some embodiments, and FIG. 4 is an exploded structural diagram of an optical module 200 in accordance with some embodiments. As shown in FIGS. 3 and 4, the optical module 200 includes a shell, a circuit board 300, a silicon optical chip 400 and a light source 500 disposed in the shell.

The shell includes an upper shell 201 and a lower shell 202. The upper shell 201 is covered on the lower shell 202 to form the shell with two openings 204 and 205, and an outer contour of the shell is generally in a cuboid shape.

In some embodiments, the lower shell 202 includes a bottom plate 2021 and two lower side plates 2022 located on both sides of the bottom plate 2021 respectively and disposed perpendicular to the bottom plate 2021; the upper shell 201 includes a cover plate 2011, and the cover plate 2011 covers the two lower side plates 2022 of the lower shell 202 to form the above shell.

In some embodiments, the lower shell 202 includes a bottom plate and two lower side plates located on two sides of the bottom plate respectively and disposed perpendicular to the bottom plate; the upper shell 201 may include a cover plate and two upper side plates located on two sides of the cover plate respectively and disposed perpendicular to the cover plate; and the two upper side plates are combined with the two lower side plates respectively, so that the upper shell 201 covers the lower shell 202.

A direction of a connecting line between the two openings 204 and 205 may be the same as a longitudinal direction of the optical module 200, or may not be the same as the longitudinal direction of the optical module 200. For example, the opening 204 is located at an end (a left end in FIG. 3) of the optical module 200, and the opening 205 is also located at an end (a right end in FIG. 3) of the optical module 200. Alternatively, the opening 204 is located at an end of the optical module 200, and the opening 205 is located on a side of the optical module 200. The opening 204 is the electrical port, a connecting finger 310 of the circuit board 30 extends from the electrical port 204, and is inserted into the master monitor (e.g., the optical network terminal 100). The opening 205 is the optical port, and is configured to access the external optical fiber 101, so that the external optical fiber 101 is connected to the silicon optical chip 400 inside the optical module 200.

By using an assembly mode of combining the upper shell 201 with the lower shell 202, it is possible to facilitate installation of components such as the circuit board 300, the silicon optical chip 400 and the light source 500 and other optical devices into the shell, and the upper shell 201 and the lower shell 202 may form encapsulation and protection for the components. In addition, when components such as the circuit board 300, the silicon optical chip 400 and the light source 500 are assembled, it is possible to facilitate arrangement of positioning parts, heat dissipation parts and electromagnetic shielding parts of the components, which is conducive to implementation of automated production.

In some embodiments, the upper shell 201 and the lower shell 202 are generally made of a metal material, which facilitates electromagnetic shielding and heat dissipation.

In some embodiments, the optical module 200 further includes an unlocking component 203 located on an outer wall of the shell thereof, and the unlocking component 203 is configured to implement or release a fixed connection between the optical module 200 and the master monitor.

For example, the unlocking component 203 is located on outer walls of the two lower side plates 2022 of the lower shell 202, and includes an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engaging component of the unlocking component 203 moves with the pulling, and then a connection relationship between the engagement component and the master monitor is changed to release engagement between the optical module 200 and the master monitor, so that the optical module 200 may be drawn out of the cage of the master monitor.

The circuit board 300 includes a circuit wiring, electronic elements, chips, etc. Through the circuit wiring, the electronic elements and the chips are connected together according to a circuit design, so as to implement functions such as power supply, transmission of electrical signals, and grounding. The electronic elements may include, for example, capacitors, resistors, triodes, and metal-oxide-semiconductor field-effect transistors (MOSFETs). The chips may include, for example, a microcontroller unit (MCU), a clock data recovery (CDR) chip, a power management chip, and a digital signal processing (DSP) chip.

The circuit board 300 is generally a rigid circuit board. The rigid circuit board may also implement a bearing function due to its hard material. For example, the rigid circuit board may stably bear the electronic elements and the chips, and the rigid circuit board may also be inserted into the electrical connector in the cage of the master monitor.

The circuit board 300 further includes a connecting finger 310 formed on an end surface thereof, and the connecting finger 310 is composed of a plurality of independent pins. The circuit board 300 is inserted into the cage 106, and the circuit board 300 is conductively connected to the electrical connector in the cage 106 through the connecting finger 310. The connecting finger 310 may be disposed on only a surface (e.g., an upper surface shown in FIG. 4) of the circuit board 300, or may be disposed on both upper and lower surfaces of the circuit board to adapt to an occasion with a demand for a large number of pins. The connecting finger 310 is configured to establish electrical connection with the master monitor to achieve power supply, grounding, transmission of I2C signals, and transmission of data signals, etc.

Of course, flexible circuit boards are also used in some optical modules. As a supplement to the rigid circuit board, a flexible circuit board is generally used in conjunction with the rigid circuit board. For example, the circuit board 300 and the light source 500 may be connected by the flexible circuit board instead of the circuit wiring.

The silicon optical chip 400 is disposed on the circuit board 300, and is electrically connected to the circuit board 300 by wire bonding. In some embodiments, the silicon optical chip 400 is disposed on a surface of the circuit board 300.

The silicon optical chip 400 is optically connected to the light source 500 through a first optical fiber ribbon 401, the silicon optical chip 400 is optically connected to an optical fiber socket 600 through a second optical fiber ribbon 402, and the optical fiber socket 600 is also optically connected to the optical fiber 101 outside the optical module 200.

The silicon optical chip 400 receives light that does not carry data from the light source 500 through the first optical fiber ribbon 401, and then loads a signal to be transmitted on the light to modulate the light and generate an optical signal, and then transmits the optical signal to the optical fiber socket 600 through the second optical fiber ribbon 402. The optical fiber socket 600 transmits the optical signal to the external optical fiber 101.

The optical fiber socket 600 receives an optical signal from the external optical fiber 101, the silicon optical chip 400 receives the optical signal from the optical fiber socket 600 through the second optical fiber ribbon 402, further converts the optical signal into a current signal, and transmits the current signal to a transimpedance amplifier 301. The transimpedance amplifier 301 converts the current signal into a differential voltage, and the DSP chip on the circuit board 300 further processes the differential voltage to extract a signal loaded in the light.

In order to complete a modulation of the light, the silicon optical chip 400 includes a Mach-Zehnder (MZ) modulator. The light that does not carry the data emitted by the light source 500 enters the MZ modulator, and the MZ modulator loads a signal to be transmitted (the signal is for example a high-speed data stream) on the light in a form of a voltage to complete the modulation of the light. In some embodiments, the MZ modulator has two interference arms, and the light entering the MZ modulator is split into two beams of light with identical amplitude and frequency, and one beam of light is input to each interference arm. A voltage is applied to the two interference arms respectively (that is, loading the signal to be transmitted), and a refractive index of the two interference arms of the MZ modulator is changed due to an electro-optical induction (the refractive index changes with a magnitude of the voltage applied to the two interference arms), an optical path difference (an optical path is a product of a geometric path of light in a medium and the refractive index of light in the medium) appears between the two beams of light respectively located in the two interference arms, thus the two beams of light respectively located in the two interference arms have a phase difference (the phase difference satisfies a formula: phase difference=(2π/wavelength)×optical path difference). If the phase difference is constant, the two beams respectively located in the two interference arms may be recombined by interference at an output terminal of the MZ modulator. In this case, the MZ modulator converts the voltage signal (that is, the signal to be transmitted) applied on the two interference arms into an optical signal, thereby completing the modulation of the light emitted by the light source 500.

The refractive index of the two interference arms of the MZ modulator is related to many factors, including a shape, structure and material of the two interference arms, and the voltage applied to the two interference arms. In a case where the shape, structure, and material of the two interference arms of the MZ modulator are basically the same, and a same voltage is applied to the two interference arms, the phase difference between the two beams of light located in the two interference arms is 0. But it is not limited thereto.

In some optical modules 200, the shape, structure, and material of the two interference arms are not completely the same. Therefore, even if the same voltage is applied to the two interference arms, the phase difference between the two beams of light located in the two interference arms will not be 0. Alternatively, in a case where the shape, structure, and material of the two interference arms are basically the same, applying different voltages to the two interference arms will also cause the phase difference between the two beams of light located in the two interference arms to be different from 0. For example, the phase difference of the two beams of light located in the two interference arms is $\pi/2$.

Figure 5:
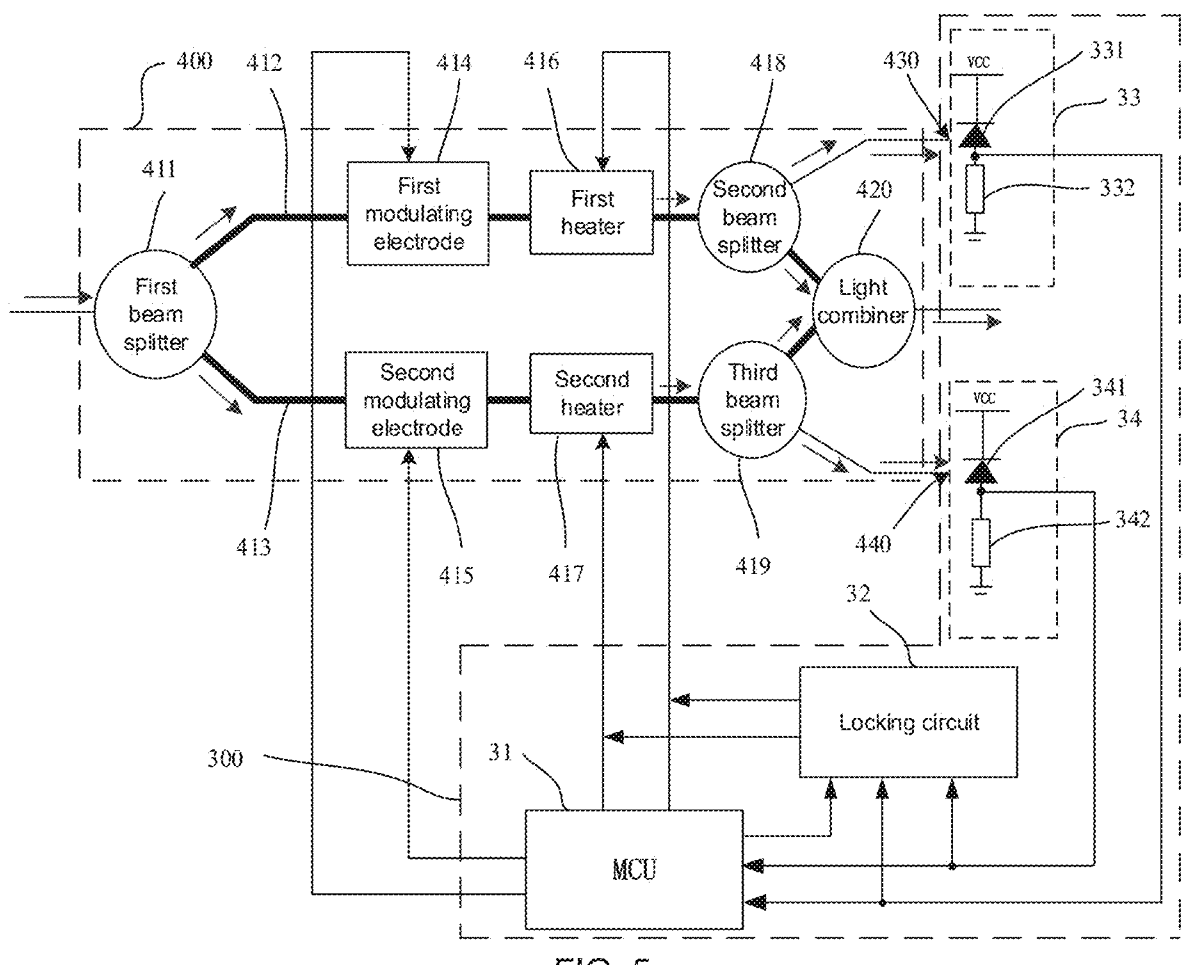
FIG. 5 is a block diagram showing an internal structure of an optical module, in accordance with some embodiments.

As shown in FIG. 5, the MZ modulator includes a first beam splitter 411, a first interference arm 412, a second interference arm 413, a first modulating electrode 414, a second modulating electrode 415 and a light combiner 420.

An input of the first beam splitter 411 is optically connected to the first optical fiber ribbon 401, and is configured to receive light from the light source 500. A first output of the first beam splitter 411 is connected to an input of the first interference arm 412, and a second output of the first beam splitter 411 is connected to an input of the second interference arm 413. The first beam splitter 411 splits the received light into two beams and transmits the two beams to the first interference arm 412 and the second interference arm 413 respectively.

An intensity of a beam of light distributed to the first interference arm 412 and an intensity of a beam of light distributed to the second interference arm 413 may be the same or different. In order to facilitate an interference of the two beams of light, the first beam splitter 411 splits the received beam of light into two beams of light with a same intensity. The intensity of the light is a relative intensity of the light, which is proportional to a square of an amplitude of the light. In some occasions, the intensity of light may also be expressed by a radiant power of light per unit area.

A first modulating electrode 414 is provided on the first interference arm 412. The first modulating electrode 414 acts on the first interference arm 412 to modulate the light input into the first interference arm 412. A second modulating electrode 415 is provided on the second interference arm 413, and the second modulating electrode 415 acts on the second interference arm 413 to modulate the light input into the second interference arm 413.

The first modulating electrode 414 and the second modulating electrode 415 are configured to receive a voltage signal provided by the circuit board 300, and the voltage signal is obtained by transforming a signal (for example, the high-speed data stream), which is to be transmitted by the optical module 200, by the circuit board 300. The voltage signal received by the first modulating electrode 414 and the voltage signal received by the second modulating electrode 415 may be the same or different. Due to the electro-optical induction, the voltage signal changes the refractive index of the first interference arm 412 and the second interference arm 413, so that the voltage signal is converted into a modulated optical signal. The modulated optical signal may convert a direct current (DC) optical signal that does not carry data received by the first interference arm 412 and the second interference arm 412 into an alternating optical signal, and the phase difference (which may or may not be 0) is generated between the alternating optical signal in the first interference arm 412 and the alternating optical signal in the second interference arm 413.

An output of the first interference arm 412 is connected to a first input of the light combiner 420, and an output of the second interference arm 413 is connected to a second input of the light combiner 420. In a case where the phase difference between the alternating optical signal in the first interference arm 412 and the alternating optical signal in the second interference arm 413 is constant, the light combiner 420 may combine the light input into the light combiner 420 by the first interference arm 412 and the second interference arm 413, and then completes a loading of the signal onto the light.

However, the MZ modulator is susceptible to interference from an external environment. As affected by a series of external conditions such as time, ambient temperature, a state of the light source 500, a plugging and unplugging of the optical fiber 101, and a coupling loss, the phase difference of the two beams of light located in the two interference arms of the MZ modulator will still change, which will cause a quality of the signal transmitted by the optical module 200 to deteriorate, and a bit error rate to increase. Therefore, some embodiments of the present disclosure provide an optical module, so that the phase difference of the MZ modulator is in a stable state for a long time.

As shown in FIG. 5, in some embodiments, the MZ modulator in the silicon optical chip 400 further includes a first heater 416, a second heater 417, a second beam splitter 418, and a third beam splitter 419.

The first heater 416 is disposed on the first interference arm 412, and the first heater 416 and the first modulating electrode 414 work together on the first interference arm 412 to modulate the light input into the first interference arm 412. The second heater 417 is disposed on the second interference arm 413, and the second heater 417 and the second modulating electrode 415 work together on the second interference arm 413 to modulate the light input into the second interference arm 413.

The first heater 416 and the second heater 417 respectively heat the first interference arm 412 and the second interference arm 413, thereby controlling the phase difference between the alternating optical signal transmitted in the first interference arm 412 and that transmitted in the second interference arm 413 to be constant. In some embodiments, the first heater 416 and the second heater 417 operate according to a driving voltage, so as to heat up or cool down the first interference arm 412 and second interference arm 413, respectively. The heating or cooling of the first interference arm 412 and the second interference arm 413 changes the refractive index of the two interference arms, thereby changing the optical path difference of the two alternating optical signals respectively located in the two interference arms, and further changing the phase difference of the two alternating optical signals, so that the phase difference of the two alternating optical signals is constant. In some implementations, the first heater 416 and the second heater 417 may also operate according to a driving current. The driving current or the driving voltage is collectively referred to as a DC bias signal, and the DC bias signal is provided by the circuit board 300.

The second beam splitter 418 is disposed on the first interference arm 412 and is close to the output of the first interference arm 412. The second beam splitter 418 is configured to split away a part of the modulated light in the first interference arm 412 and send it to a first monitoring optical port 430 (which will be described later). The second beam splitter 418 may split away 2% to 4%, such as 2%, 2.5%, 3%, 3.5%, 4%, of the light in the first interference arm 412 to the first monitoring optical port 430.

The third beam splitter 419 is disposed on the second interference arm 413 and is close to the output of the second interference arm 413. The third optical splitter 419 is configured to split away a part of the modulated light in the second interference arm 413 and send it to a second monitoring optical port 440 (which will be described later). The third optical splitter 419 may split away 2% to 4%, such as 2%, 2.5%, 3%, 3.5%, 4%, of the light in the second interference arm 413 to the second monitoring optical port 440.

The second beam splitter 418 and the third beam splitter 419 may split away a same proportion of light.

In some embodiments, the silicon optical chip 400 further includes an input optical port, an output optical port, the first monitoring optical port 430, the second monitoring optical port 440, a high-speed electrical signal interface, and a DC bias signal interface. The input optical port is configured to couple the light output from the light source 500 into the silicon optical chip 400; the output optical port is configured to output the modulated light out of the silicon optical chip 400; the first monitoring optical port 430 is configured to receive a part of light split away from the modulated light in the first interference arm 412 to monitor the intensity of the light in the first interference arm 412; the second monitoring optical port 440 is configured to receive a part of light split away from the modulated light in the second interference arm 413 to monitor the intensity of the light in the second interference arm 413; the high-speed electrical signal interface is configured to transmit the voltage signal to the first modulating electrode 414 and the second modulating electrode 415 to modulate the light emitted by the light source 500; and the DC bias signal interface is configured to transmit the driving voltage or driving current to the first heater 416 and the second heater 417.

In some embodiments, as shown in FIG. 5, in addition to the MCU 31 (such as a processor or a microprocessor), the circuit board 300 further includes a first sampling circuit 33, a second sampling circuit 34 and a locking circuit 32. The MCU 31 in the circuit board 300 is electrically connected to the first sampling circuit 33, the second sampling circuit 34 and the locking circuit 32, and the first sampling circuit 33 and the second sampling circuit 34 are also electrically connected to the locking circuit 32.

The first sampling circuit 33 is optically connected to the first monitoring optical port 430 of the silicon optical chip 400, and is configured to receive an optical signal transmitted through the first monitoring optical port 430 and generate a first sampling voltage according to the optical signal, and transmit the first sampling voltage to the MCU 31. The second sampling circuit 34 is optically connected to the second monitoring optical port 440 of the silicon optical chip 400, and is configured to receive an optical signal transmitted through the second monitoring optical port 440 and generate a second sampling voltage according to the optical signal, and transmit the second sampling voltage to the MCU 31.

The first sampling circuit 33 includes a first photodetector 331 and a first sampling resistor 332. An end of the first photodetector 331 is connected to an external power supply VCC, and another end of the first photodetector 331 is connected to an end of the first sampling resistor 332, the MCU 31 and the locking circuit 32; another end of the first sampling resistor 332 is grounded. The light split away by the second beam splitter 418 from the first interference arm 412 is transmitted to the first photodetector 331 through the first monitoring optical port 430. The first photodetector 331 converts the received light into a photocurrent, and the first sampling resistor 332 converts the photocurrent into a voltage, and transmits the voltage to the MCU 31 and the locking circuit 32 as the first sampling voltage.

The second sampling circuit 34 includes a second photodetector 341 and a second sampling resistor 342. An end of the second photodetector 341 is connected to the external power supply VCC, and another end of the second photodetector 341 is connected to an end of the second sampling resistor 342, the MCU 31 and the locking circuit 32; another end of the second sampling resistor 342 is grounded. The light split away by the third beam splitter 419 from the second interference arm 413 is transmitted to the second photodetector 341 through the second monitoring optical port 440. The second photodetector 341 converts the received light into a photocurrent, and the second sampling resistor 342 converts the photocurrent into a voltage, and transmits the voltage to the MCU 31 and the locking circuit 32 as the second sampling voltage.

In some embodiments, the first photodetector 331 is a photodiode. A cathode of the photodiode is connected to the external power supply VCC, and an anode of the photodiode is connected to the end of the first sampling resistor 332 and the MCU 31. The second photodetector 341 is a photodiode. A cathode of the photodiode is connected to the external power supply VCC, and an anode of the photodiode is connected to the end of the second sampling resistor 342 and the MCU 31.

The locking circuit 32 is electrically connected to the DC bias signal interface of the silicon optical chip 400, and transmits a driving signal to the DC bias signal interface according to a difference between an amplitude of the first sampling voltage and an amplitude of the second sampling voltage, so as to control an operation of a heater that is more sensitive to the driving signal within the first heater 416 and the second heater 417, thereby causing the first sampling voltage and the second sampling voltage to approach to each other. In a case where the difference between the first sampling voltage and the second sampling voltage decreases, a difference of the light intensity of the two beams of light located respectively in the first interference arm 412 and the second interference arm 413 is reduced, so that the phase difference of the two beams of light is changed, and finally the phase difference of the two beams of light is kept constant. The driving signal includes the driving voltage or the driving current.

The MCU 31 is electrically connected to the DC bias signal interface of the silicon optical chip 400, and the MCU 31 transmits the driving signal to the first heater 416 and the second heater 417 through the DC bias signal interface, so as to determine which heater of the first heater 416 and the second heater 417 is more sensitive to the driving signal. For example, the MCU 31 sends the DC bias signal to the first heater 416 and the second heater 417 in sequence through the DC bias signal interface, so as to obtain a first optical power of the optical module 200 when the DC bias signal is supplied to the first heater 416 and a second optical power of the optical module 200 when the DC bias signal is supplied to the second heater 417, and selects the heater more sensitive to the driving signal within the first heater 416 and second heater 417 according to the first optical power and the second optical power.

Figure 6:
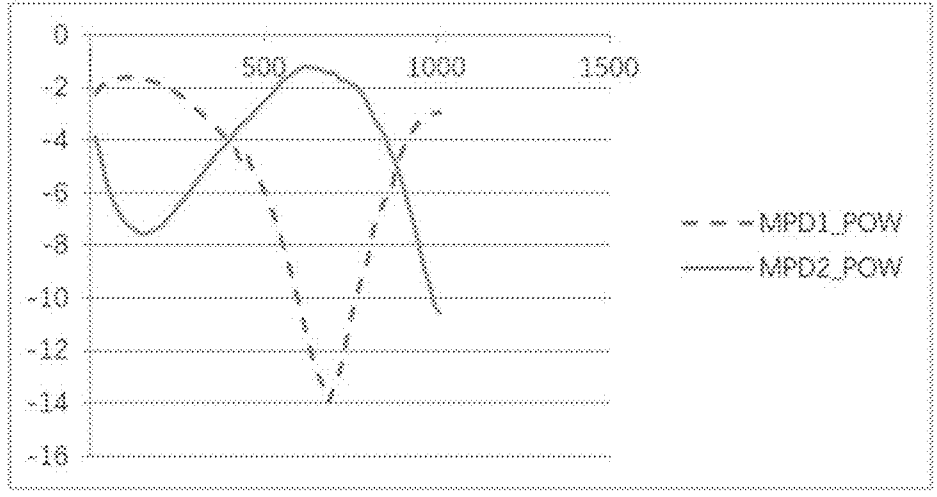
FIG. 6 is a response curve of a first heater in an optical module, in accordance with some embodiments.

The MCU 31 outputs the driving current to the first heater 416, obtains a response characteristic of the first heater 416 in a full range of the driving current, and plots response curves (i.e., the first optical power) of the first heater 416 according to the first sampling voltage and the second sampling voltage respectively. The response curves of the first heater 416 are shown in FIG. 6.

Figure 7:
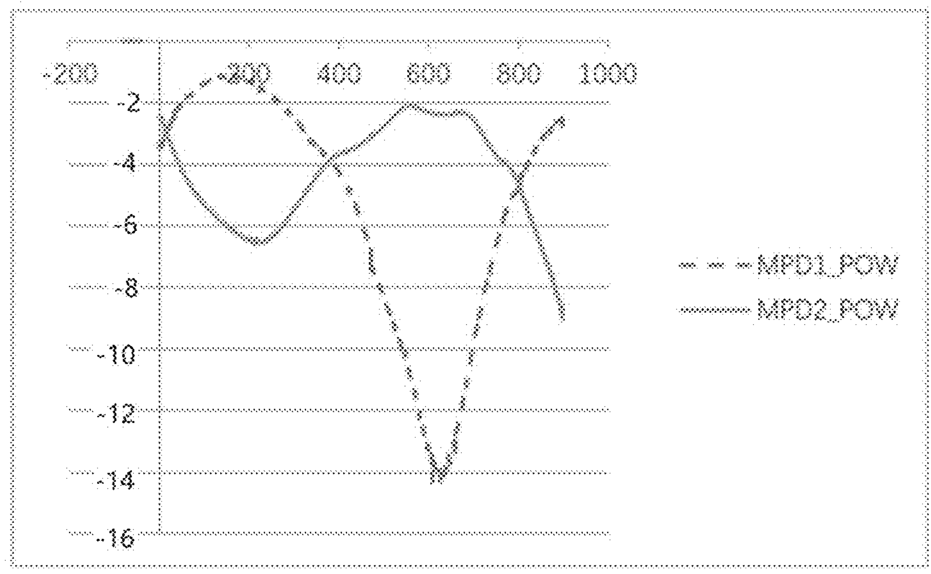
FIG. 7 is a response curve of a second heater in an optical module, in accordance with some embodiments.

The MCU 31 also outputs the driving current to the second heater 417, obtains a response characteristic of the second heater 417 in a full range of the driving current, and plots response curves (i.e., the second optical power) of the second heater 417 according to the first sampling voltage and the second sampling voltage respectively. The response curves of the second heater 417 are shown in FIG. 7.

According to the response curves of the first heater 416 and the response curves of the second heater 417, the heater that is more sensitive to the driving signal within the first heater 416 and the second heater 417 is selected for later use, and another heater is not used (that is, no driving signal is applied thereto).

In a case where the first sampling voltage and the second sampling voltage are adjusted by applying the driving signal to the first heater 416 and/or the second heater 417, if the driving signal is applied to both the first heater 416 and the second heater 417, the adjustment operation described above becomes cumbersome and has reduced controllability due to too many variables, and will also increase a power consumption of the optical module. In some embodiments, if the driving signal is applied to only one of the first heater 416 and second heater 417, the difficulty of the adjustment operation may be reduced, the reliability of the adjustment result may be increased, and the power consumption of the optical module 200 may be reduced.

In a process in which the MCU 31 applies the driving current to the first heater 416, the MCU 31 gradually increases the driving current from 0 to about 100 mA. The numbers 1 to 1000 on an abscissa in FIG. 6 represent the driving current from 0 to 100 mA, and an ordinate represents the optical power based on the first sampling voltage and the second sampling voltage. In FIG. 6, MPD1_POW is an optical power curve based on the first sampling voltage, and MPD2_POW is an optical power curve based on the second sampling voltage.

In a process in which the MCU 31 applies the driving current to the second heater 417, the MCU 31 gradually increases the driving current from 0 to about 100 mA. The numbers 1 to 1000 on an abscissa in FIG. 7 represent the driving current from 0 to 100 mA, and an ordinate represents the optical power based on the first sampling voltage and the second sampling voltage. MPD1_POW in FIG. 7 is an optical power curve based on the first sampling voltage, and MPD2_POW is an optical power curve based on the second sampling voltage.

Commonly used units of the optical power are milliwatts (mw) and decibel milliwatts (dBm), and a relationship between the two is 1 mw is equal to 0 dBm (i.e., 1 mw=0 dBm); and in a case where the optical power less than 1 mw uses the decibel milliwatts as the unit, the optical power is expressed as a negative value.

According to FIG. 6, when the first heater 416 is driven to reach a first power balance point −4 dBm, the driving current output by the MCU 31 is about 40 mA (the abscissa is 400). According to FIG. 7, when the second heater 417 is driven to reach a first power balance point of −3 dBm, the driving current output by the MCU 31 is about 1 mA (the abscissa is 10).

It may be seen that, the second heater 417 may reach the power balance point based on a smaller driving current compared with the first heater 416, so it is determined that the second heater 417 is more sensitive to the driving signal. The locking circuit 32 applies the driving signal to the second heater 417 to adjust the first sampling voltage and the second sampling voltage, so as to keep the phase difference of the two beams of light respectively located in the two interference arms constant.

The MCU 31 has a built-in analog-to-digital converter and a digital-to-analog converter. The analog-to-digital converter is configured to convert the two sampling voltages from an analog signal into a digital signal, and the digital-to-analog converter is configured to convert the driving currents sequentially sent to the first heater 416 and the second heater 417 from a digital signal into an analog signal.

Figure 8:
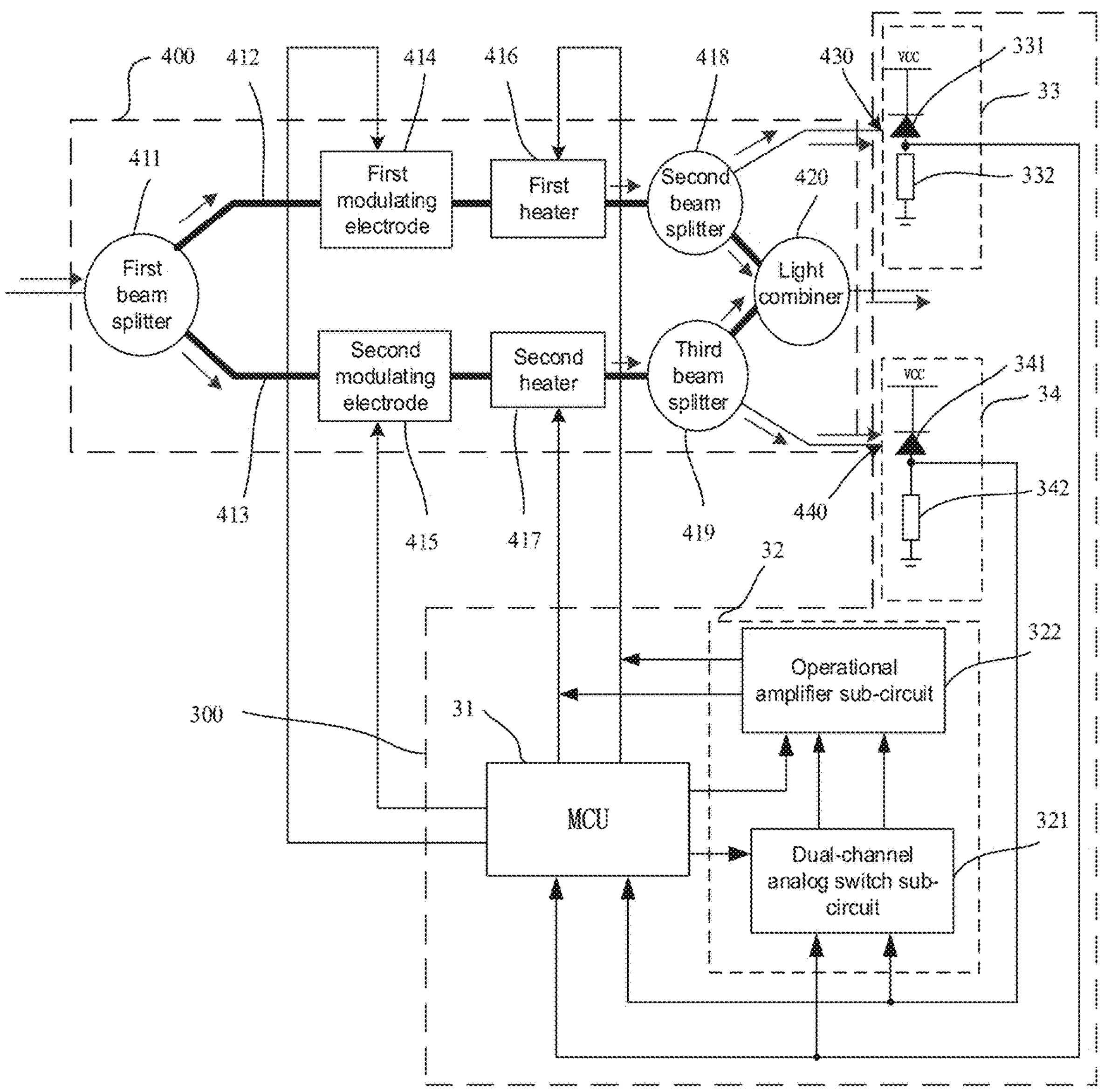
FIG. 8 is a block diagram showing an internal structure of another optical module, in accordance with some embodiments.

FIG. 8 is a block diagram of the internal structure of another optical module in accordance with some embodiments. As shown in FIG. 8, the locking circuit 32 includes a dual-channel analog switch sub-circuit 321 and an operational amplifier sub-circuit 322.

A first input of the dual-channel analog switch sub-circuit 321 is electrically connected to the first sampling circuit 33, a second input thereof is electrically connected to the second sampling circuit 34, and two outputs of the dual-channel analog switch sub-circuit 321 are respectively electrically connected to a positive input and a negative input of the operational amplifier sub-circuit 322. The outputs of the operational amplifier sub-circuit 322 are electrically connected to the first heater 416 and the second heater 417, respectively.

In some embodiments, the dual-channel analog switch sub-circuit 321 receives the first sampling voltage from the first sampling circuit 33 and the second sampling voltage from the second sampling circuit 34, and identifies the amplitude of the first sampling voltage and the amplitude of the second sampling voltage. A sampling voltage with a larger amplitude in the first sampling voltage and the second sampling voltage is transmitted to the positive input of the operational amplifier sub-circuit 322, and a sampling voltage with a smaller amplitude of the two is transmitted to the negative input of the operational amplifier sub-circuit 322. The operational amplifier sub-circuit 322 amplifies an amplitude difference between the sampling voltages at the positive input and the negative input, and applies the driving signal to the heater that is more sensitive to the driving signal according to the amplified amplitude difference.

Figure 9:
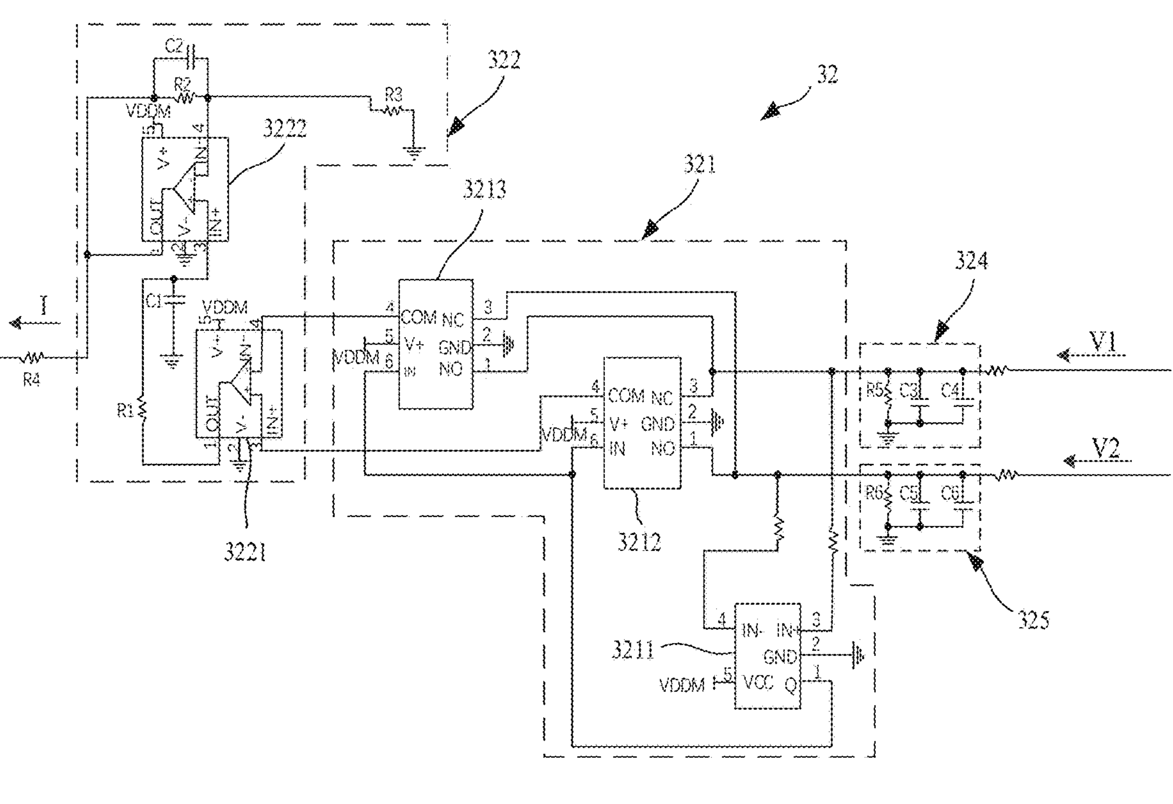
FIG. 9 is a structural schematic diagram of a locking circuit in an optical module, in accordance with some embodiments.

FIG. 9 is a structural schematic diagram of the locking circuit 32 in accordance with some embodiments. As shown in FIG. 9, the dual-channel analog switch sub-circuit 321 includes a comparator 3211, a first analog switch 3212, and a second analog switch 3213.

A non-inverting input pin (IN+) of the comparator 3211 is connected to the first sampling circuit 33, an inverting input pin (IN−) of the comparator 3211 is connected to the second sampling circuit 34, and an output pin (Q) of the comparator 3211 is connected to an input pin (IN) of the first analog switch 3212 and an input pin (IN) of the second analog switch 3213. A ground pin (GND) of the comparator 3211 is grounded, and a power supply pin (VCC) of the comparator 3211 is connected to the external power supply VDDM.

A normally closed pin (NC) of the first analog switch 3212 is connected to the first sampling circuit 33, and a normally open pin (NO) of the first analog switch 3212 is connected to the second sampling circuit 34. An output pin (COM) of the first analog switch 3212 is connected to the input of the operational amplifier sub-circuit 322. The ground pin (GND) of the first analog switch 3212 is grounded, and a power supply pin (V+) of the first analog switch 3212 is connected to the external power supply VDDM.

A normally open pin (NO) of the second analog switch 3213 is connected to the first sampling circuit 33, and a normally closed pin (NC) of the second analog switch 3213 is connected to the second sampling circuit 34. An output pin (COM) of the second analog switch 3213 is connected to the input of the operational amplifier sub-circuit 322. A ground pin (GND) of the second analog switch 3213 is grounded, and a power supply pin (V+) of the second analog switch 3213 is connected to the external power supply VDDM.

In some embodiments, a model of the comparator 3211 may be MAX999, and a model of the first analog switch 3212 and the second analog switch 3213 may be SGM4157.

The comparator 3211 compares the amplitude of the first sampling voltage V1 input from the non-inverting input pin (IN+) of the comparator 3211 and the amplitude of the second sampling voltage V2 input from the inverting input pin (IN−) of the comparator 3211, and outputs a control signal according to the amplitude of the first sampling voltage V1 and the amplitude of the second sampling voltage V2. The control signal acts on the first analog switch 3212 and the second analog switch 3213, so that the first analog switch 3212 outputs the voltage with the larger amplitude in the first sampling voltage V1 and the second sampling voltage V2, and the second analog switch 3213 outputs the voltage with the smaller amplitude in the first sampling voltage V1 and the second sampling voltage V2.

As shown in FIG. 9, the operational amplifier sub-circuit 322 includes a first operational amplifier 3221 and a second operational amplifier 3222.

A non-inverting input pin (IN+) of the first operational amplifier 3221 is connected to the output pin (COM) of the first analog switch 3212, and an inverting input pin (IN−) of the first operational amplifier 3221 is connected to the output pin (COM) of the second analog switch 3213; an output pin (OUT) of the first operational amplifier 3221 is connected to the non-inverting input pin (IN+) of the second operational amplifier 3222.

The inverting input pin (IN−) of the second operational amplifier 3222 is connected to an output pin (OUT) of the second operational amplifier 3222, and the output pin (OUT) of the second operational amplifier 3222 is connected to the first heater 416 and the second heater 417.

In some embodiments, a model of the first operational amplifier 3221 and the second operational amplifier 3222 may be OPA354.

The first operational amplifier 3221 receives the voltage with the larger amplitude in the first sampling voltage V1 and the second sampling voltage V2 through the non-inverting input pin (IN+), and receives the voltage with the smaller amplitude in the first sampling voltage V1 and the second sampling voltage V2 through the inverting input pin (IN−). The first operational amplifier 3221 amplifies the amplitude difference between the voltage input from the non-inverting input pin (IN+) and the voltage input from the inverting input pin (IN−). The amplified amplitude difference is transmitted to the non-inverting input pin (IN+) of the second operational amplifier 3222. The second operational amplifier 3222 outputs the driving voltage to control the second heater 417 according to a feedback voltage received through the inverting input pin (IN−) (the feedback voltage is a voltage currently applied to the second heater 417).

In a case where the amplitude of the first sampling voltage V1 is greater than the amplitude of the second sampling voltage V2, the second operational amplifier 3222 increases the driving voltage output to the second heater 417 to heat the second interference arm 413 up. In a case where the amplitude of the first sampling voltage V1 is less than the amplitude of the second sampling voltage V2, the second operational amplifier 3222 reduces the driving voltage output to the second heater 417 to lower the temperature of the second interference arm 413.

The second operational amplifier 3222 is used to increase a driving capability of the driving voltage. Due to a feedback effect of the second operational amplifier 3222, the amplitude of the first sampling voltage received by the non-inverting input pin (IN+) of the first operational amplifier 3221 and the amplitude of the second sampling voltage received by the inverting input pin (IN−) are gradually approaching, so that the phase difference of the two beams of light located in the two interference arms of the MZ modulator is locked.

As shown in FIG. 9, in some embodiments, the operational amplifier sub-circuit 322 further includes an integrating sub-circuit. The integrating sub-circuit includes a first resistor R1 and a first capacitor C1. The first resistor R1 is connected in series between the output pin (OUT) of the first operational amplifier 3221 and the non-inverting input pin (IN+) of the second operational amplifier 3222. An end of the first capacitor C1 is connected to the first resistor R1 and the non-inverting input pin (IN+) of the second operational amplifier 3222, and another end of the first capacitor C1 is grounded. A combination of the integrating sub-circuit and the first operational amplifier 3221 may more accurately amplify the amplitude difference between the voltage input from the non-inverting input pin (IN+) of the first operational amplifier 3221 and the voltage input from the inverting input pin (IN−) of the first operational amplifier 3221.

As shown in FIG. 9, in some embodiments, the operational amplifier sub-circuit 322 further includes a driving amplifier sub-circuit. The driving amplifier sub-circuit includes a second resistor R2, a second capacitor C2, and a third resistor R3. The second resistor R2 is connected in series between the inverting input pin (IN−) of the second operational amplifier 3222 and the output pin (OUT) of the second operational amplifier 3222. The second capacitor C2 is connected in parallel with the second resistor R2. An end of the third resistor R3 is connected to the inverting input pin (IN−) of the second operational amplifier 3222, and another end is grounded. A combination of the driving amplifier sub-circuit and the second operational amplifier 3222 may realize an adjustment and a control of an amplification factor of the second operational amplifier 3222, which is more convenient and accurate to complete an amplification of the driving signal.

As shown in FIG. 9, in some embodiments, a fourth resistor R4 is provided between the output pin (OUT) of the second operational amplifier 3222 and the second heater 417 (and the first heater 416). The fourth resistor R4 has a voltage dividing function and is configured to reduce a voltage of the driving current I output by the second operational amplifier 3222.

In some embodiments, as shown in FIG. 9, the locking circuit 32 further includes a first filter sub-circuit 324 and a second filter sub-circuit 325. The first filter sub-circuit 324 is connected in series between an output of the first sampling circuit 33 and an input (for example, the normally closed pin NC) of the dual-channel analog switch sub-circuit 321, and the second filter sub-circuit 325 is connected in series between an output of the second sampling circuit 34 and an input (for example, the normally open pin NO) of the dual-channel analog switch sub-circuit 321. The first filter sub-circuit 324 is used to filter out a clutter in the first sampling voltage V1 to improve a flatness of the first sampling voltage V1, and the second filter sub-circuit 325 is used to filter out a clutter in the second sampling voltage V2 to improve a flatness of the second sampling voltage V2.

The first filter sub-circuit 324 includes a fifth resistor R5, a third capacitor C3, and a fourth capacitor C4, and the second filter sub-circuit 325 includes a sixth resistor R6, a fifth capacitor C5, and a sixth capacitor C6.

An end of the fifth resistor R5 is connected to the input (for example, the normally closed pin NC) of the dual-channel analog switch sub-circuit 321 and the output of the first sampling circuit 33, another end thereof is grounded. The third capacitor C3 is connected in parallel with the fifth resistor R5, and the fourth capacitor C4 is connected in parallel with the third capacitor C3.

An end of the sixth resistor R6 is connected to the input (for example, the normally open pin NO) of the dual-channel analog switch sub-circuit 321 and the output of the second sampling circuit 34, and another end thereof is grounded. The fifth capacitor C5 is connected in parallel with the sixth resistor R6, and the sixth capacitor C6 is connected in parallel with the fifth capacitor C5.

The MCU 31 is also electrically connected to the high-speed electrical signal interface of the silicon optical chip 400, and the MCU 31 transmits the voltage signal to the first modulating electrode 414 and the second modulating electrode 415 through the high-speed electrical signal interface, so that the signal to be transmitted may be loaded on the light emitted by the light source 500.

The optical module in some embodiments of the present disclosure may control an operation of the first heater or the second heater according to the first sampling voltage and the second sampling voltage, so as to adjust the heating or cooling of the first interference arm or the second interference arm to change the refractive index of the first interference arm or the second interference arm, so that the first sampling voltage and the second sampling voltage approach to each other, and the phase difference of the two beams of light respectively located in the two interference arms is kept constant. Therefore, the bit error rate of the optical module 200 is reduced, and the quality of the signal transmitted by the optical module 200 is improved.

It will be noted that, in some embodiments, it is not necessary for the MCU 31 to determine which of the first heater 416 and the second heater 417 is more sensitive to the driving signal, and the locking circuit 32 is either not necessary.

Figure 10:
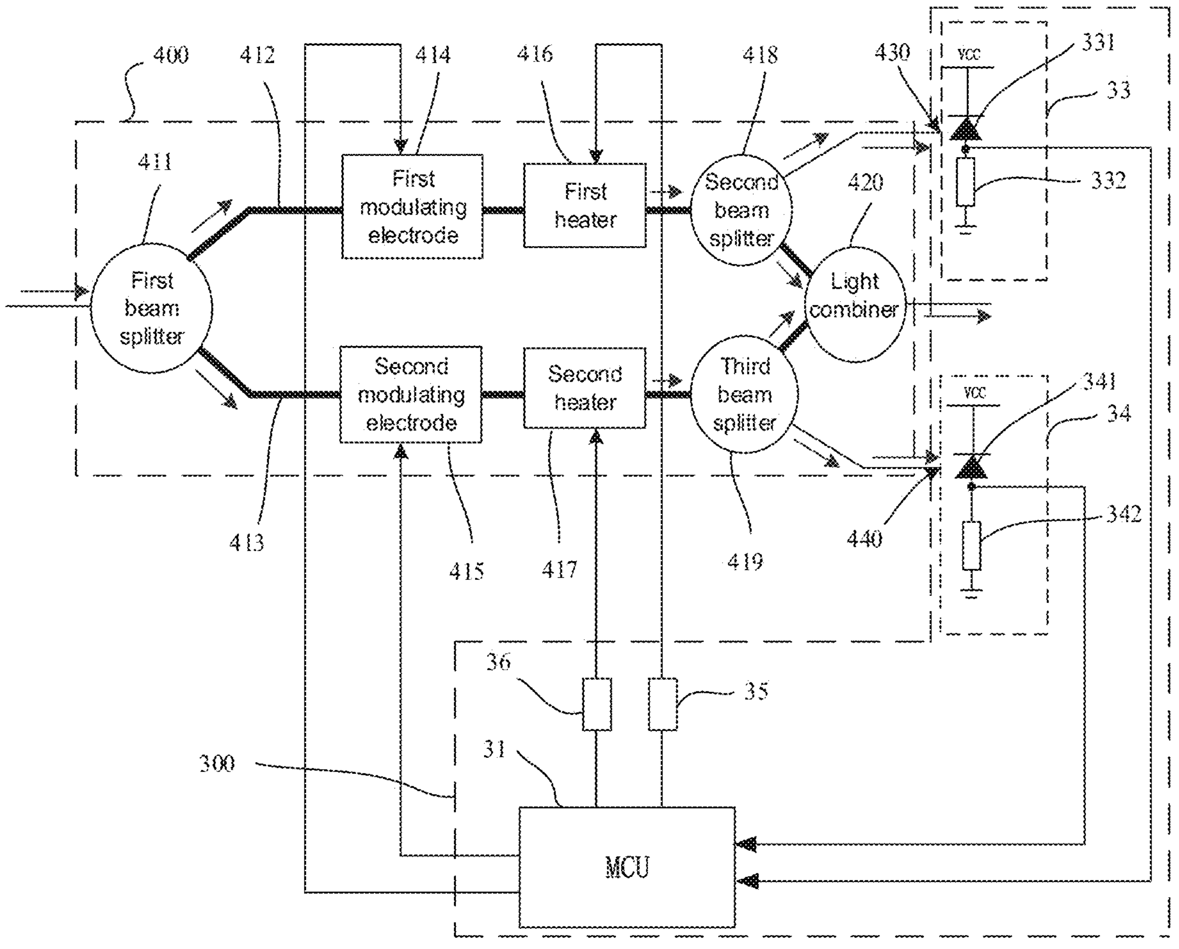
FIG. 10 is a block diagram showing an internal structure of another optical module, in accordance with some embodiments.

FIG. 10 is a block diagram showing an internal structure of another optical module in accordance with some embodiments. As shown in FIG. 10, the MCU 31 receives the first sampling voltage and the second sampling voltage, and determines whether the difference between the amplitude of the first sampling voltage and the amplitude of the second sampling voltage is 0 (that is, determines whether the first sampling voltage is equal to the second sampling voltage), and sends the driving signal to the first heater 416 and/or the second heater 417 according to a judgment result.

In a case where the judgment result is that the difference between the amplitude of the first sampling voltage and the amplitude of the second sampling voltage is 0, the driving voltages transmitted by the MCU 31 to the two heaters 416 and 417 are equal. The driving voltage may be equal to a standard driving voltage, for example 1.5V.

In a case where the judgment result is that the difference between the amplitude of the first sampling voltage and the amplitude of the second sampling voltage is not 0, the driving voltages transmitted by the MCU 31 to the two heaters 416 and 417 are not equal.

For example, in a case where the first sampling voltage is greater than the second sampling voltage, the driving voltage transmitted from the MCU 31 to the first heater 416 is less than the standard driving voltage, and the driving voltage transmitted to the second heater 417 is greater than the standard driving voltage. In this way, the cooling of the first interference arm 412 and the heating of the second interference arm 413 change the refractive index of the two interference arms. Therefore, the optical path difference of the two alternating optical signals respectively located in the two interference arms is changed, and the phase difference of the two alternating light signals is changed, so that the phase difference of the two alternating light signals is constant.

Conversely, in a case where the first sampling voltage is less than the second sampling voltage, the driving voltage transmitted by the MCU 31 to the first heater 416 is greater than the standard driving voltage, and the driving voltage transmitted to the second heater 417 is less than the standard driving voltage. In this way, the heating of the first interference arm 412 and the cooling of the second interference arm 413 change the refractive index of the two interference arms. Therefore, the optical path difference of the two alternating optical signals respectively located in the two interference arms is changed, and the phase difference of the two alternating light signals is changed, so that the phase difference of the two alternating light signals is constant.

As shown in FIG. 10, the circuit board 300 further includes two voltage dividing resistors 35 and 36. An end of the first voltage dividing resistor 35 is electrically connected to the MCU 31, and another end thereof is electrically connected to the first heater 416 for voltage division. An end of the second voltage dividing resistor 36 is electrically connected to the MCU 31, and another end thereof is electrically connected to the second heater 417 for voltage division.

In some embodiments, in a case where the driving signal output by the MCU 31 is the driving current, two driving currents are converted into two driving voltages after being divided by the first voltage dividing resistor 35 and the second voltage dividing resistor 36. The two driving voltages are respectively transmitted to the first heater 416 and the second heater 417.

In the optical module 200 shown in FIG. 10, MCU 31 transmits the driving signal to the DC bias signal interface of the silicon optical chip 400 according to the difference between the amplitude of the first sampling voltage and the amplitude of the second sampling voltage, so as to control the operation of the first heater 416 and the second heater 417, thereby causing the first sampling voltage and the second sampling voltage to approach to each other. In a case where the difference between the first sampling voltage and the second sampling voltage decreases, the light intensity difference of the two beams of light respectively located in the first interference arm 412 and the second interference arm 413 is reduced, so that the phase difference of the two beams of light is changed, and finally the phase difference of the two beams of light is kept constant. The driving signal includes the driving voltage or the driving current.

It will also be noted that, in some embodiments, it is not necessary to directly sample the optical signal in the first interference arm 412 and the optical signal in the second interference arm 413 to keep the phase difference between the two beams of light respectively located in the first interference arm 412 and the second interference arm 413 to be constant.

Figure 11:
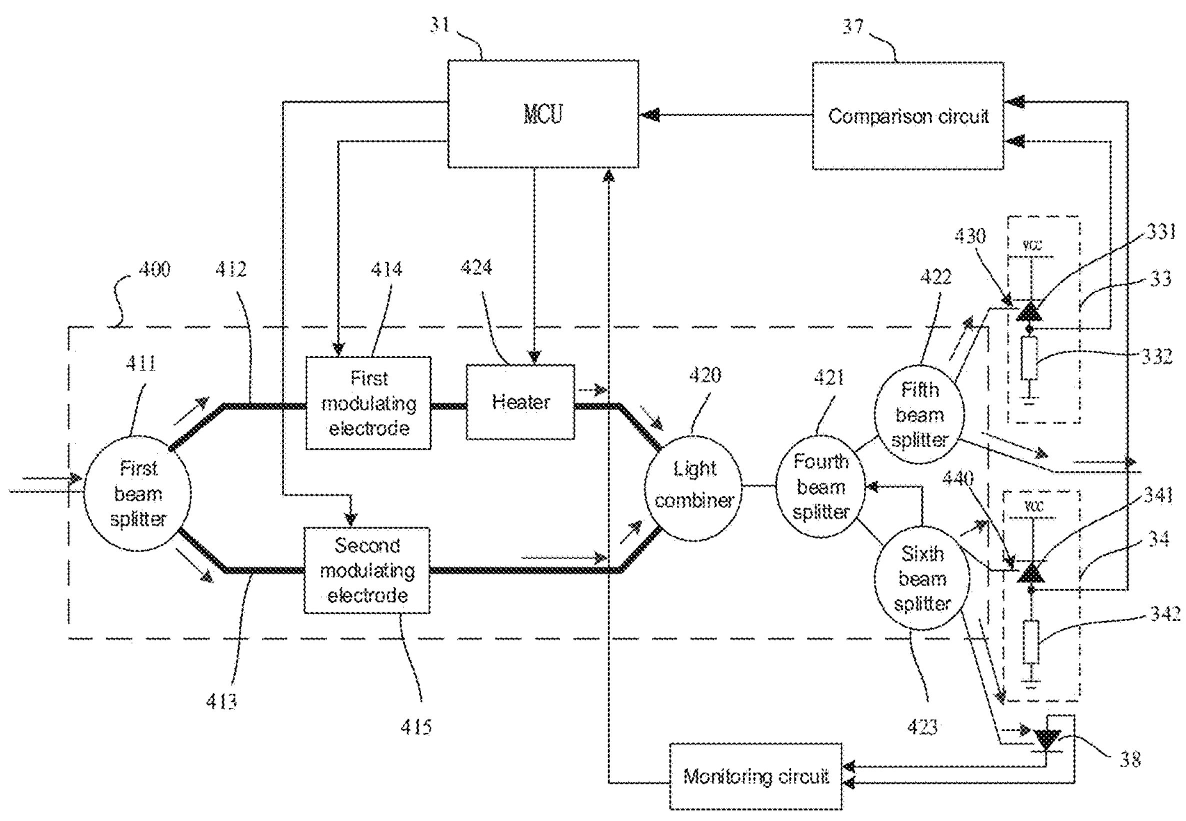
FIG. 11 is a block diagram showing an internal structure of another optical module, in accordance with some embodiments.

FIG. 11 is a block diagram showing an internal structure of another optical module in accordance with some embodiments. Components in FIG. 11 that are the same as components in FIGS. 5, 8, and 10 use a same reference numeral, and the same components will not be described in detail. The following describes in detail only the components in FIG. 11 that are different from the components in FIGS. 5, 8, and 10.

As shown in FIG. 11, the MZ modulator omits the second beam splitter 418, the third beam splitter 419, the first heater 416, and the second heater 417, but includes a fourth beam splitter 421, a fifth beam splitter 422, a sixth beam splitter 423 and a heater 424. It will be noted that the second beam splitter 418, the third beam splitter 419, the fifth beam splitter 422, and the sixth beam splitter 423 play a same role, but their names are different; the first heater 416, the second heater 417 and the heater 424 play a same role, but their names are different.

An input of the fourth beam splitter 421 is connected to the output of the light combiner 420, a first output of the fourth beam splitter 421 is connected to an input of the fifth beam splitter 422, and a second output of the fourth beam splitter 421 is connected to an input of the sixth beam splitter 423. The fourth beam splitter 421 receives the optical signal from the light combiner 420, and splits the optical signal into output light and monitoring light. The fourth beam splitter 421 sends the output light to the fifth beam splitter 422 and the monitoring light to the sixth beam splitter 423.

A first output of the fifth beam splitter 422 is optically connected to the first monitoring optical port 430, and a second output of the fifth beam splitter 422 is optically connected to the output optical port of the silicon optical chip 400. The fifth beam splitter splits away a part of the output light to the first monitoring optical port 430, and outputs the remaining output light to the output optical port of the silicon optical chip 400. The fifth beam splitter 422 may split away 2% to 4%, such as 2%, 2.5%, 3%, 3.5%, 4%, of the output light to the first monitoring optical port 430.

A first output of the sixth beam splitter 423 is optically connected to the second monitoring optical port 440, and the sixth beam splitter 423 splits away a part of the monitoring light to the second monitoring optical port 440. The sixth beam splitter 423 may split away 2% to 4%, such as 2%, 2.5%, 3%, 3.5%, 4%, of the monitoring light to the second monitoring optical port 440.

The heater 424 is provided on the first interference arm 412. The heater 424 and the first modulating electrode 414 work together on the first interference arm 412 to modulate the light input into the first interference arm 412. However, it is not limited thereto. The heater 424 may also be disposed on the second interference arm 413, and act on the second interference arm 413 together with the second modulating electrode 415 to modulate the light input into the second interference arm 413.

The circuit board 300 includes the MCU 31, the first sampling circuit 33, the second sampling circuit 34 and a comparison circuit 37.

The first photodetector 331 of the first sampling circuit 33 receives the output light output from the first monitoring optical port 430 and converts the received output light into the photocurrent. The first sampling resistor 332 converts the photocurrent into the voltage, and transmits the voltage to the comparison circuit 37 as the first sampling voltage. The first sampling voltage reflects an intensity of the output light.

The second photodetector 341 of the second sampling circuit 34 receives the monitoring light output from the second monitoring optical port 440, and converts the received monitoring light into the photocurrent. The second sampling resistor 342 converts the photocurrent into the voltage, and transmits the voltage to the comparison circuit 37 as the second sampling voltage. The second sampling voltage reflects an intensity of the monitoring light.

The comparison circuit 37 receives and compares the first sampling voltage and the second sampling voltage, and then transmits a comparison result to the MCU 31. It may be determined whether the intensity of the output light and the intensity of the monitoring light are equal by comparing the first sampling voltage with the second sampling voltage through the comparison circuit 37.

Figure 12:
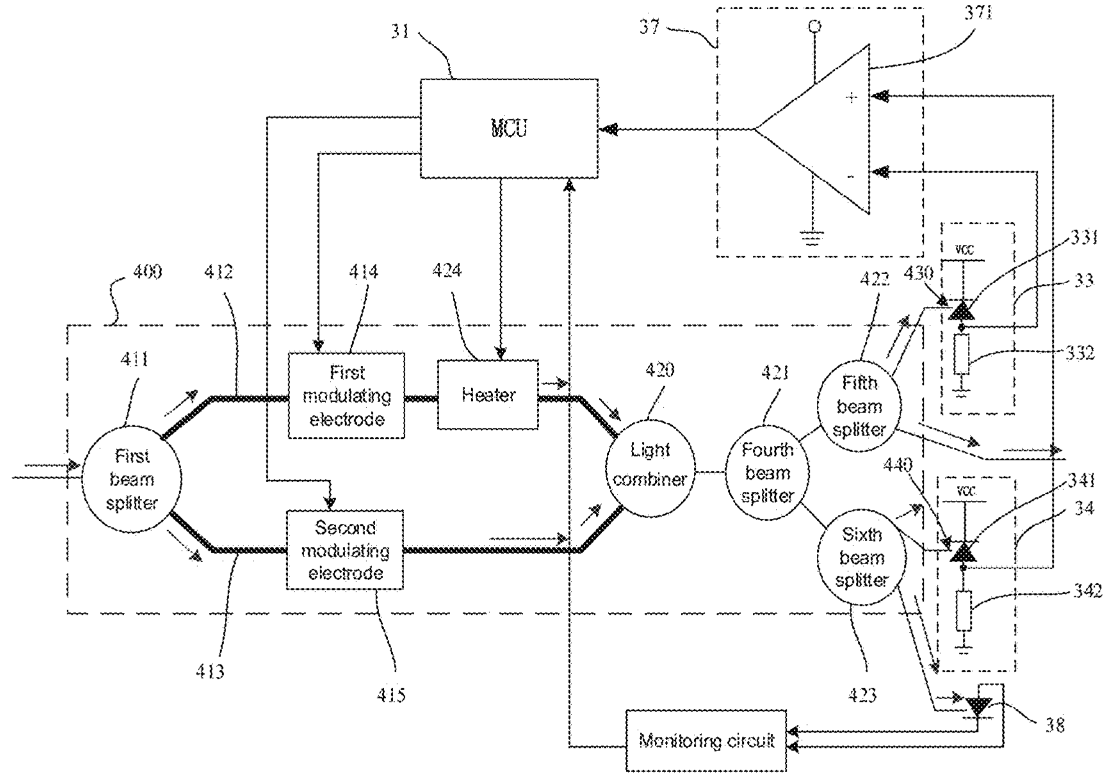
FIG. 12 is a block diagram showing an internal structure of another optical module, in accordance with some embodiments.

As shown in FIG. 12, the comparison circuit 37 includes a comparator 371. An inverting input of the comparator 371 is connected to the output of the first sampling circuit 33, a non-inverting input of the comparator 371 is connected to the output of the second sampling circuit 34, and an output of the comparator 371 is connected to the input of the MCU 31.

In a first implementation, the comparator 371 receives the first sampling voltage and the second sampling voltage, and compares the amplitude of the first sampling voltage with the amplitude of the second sampling voltage. If the first sampling voltage is greater than the second sampling voltage (that is, the intensity of the output light is stronger than the intensity of the monitoring light), the comparator 371 outputs a low level to the MCU 31. If the first sampling voltage is less than the second sampling voltage (that is, the intensity of the output light is less than the intensity of the monitoring light), the comparator 371 outputs a high level to the MCU 31.

The MCU 31 adjusts the voltage applied to the heater 424 according to the received high level or low level. For example, the MCU 31 increases the voltage applied to the heater 424 according to the received high level to raise the temperature of the first interference arm 412; the MCU 31 decreases the voltage applied to the heater 424 according to the received low level to lower the temperature of the first interference arm 412.

In a second implementation, the comparator 371 receives the first sampling voltage and the second sampling voltage, compares the amplitude of the first sampling voltage with the amplitude of the second sampling voltage, and outputs the amplitude difference between the first sampling voltage and the second sampling voltage (the amplitude of the second sampling voltage minus the amplitude of the first sampling voltage). The MCU 31 receives the amplitude difference, and adjusts the driving voltage applied to the heater 424 according to the amplitude difference.

If the intensity of the output light is greater than the intensity of the monitoring light, the amplitude of the first sampling voltage is greater than the amplitude of the second sampling voltage, and the amplitude difference output by the comparator 371 is less than 0. If the intensity of the output light is less than the intensity of the monitoring light, the amplitude of the first sampling voltage is less than the amplitude of the second sampling voltage, and the amplitude difference output by the comparator 371 is greater than 0. If the intensity of the output light is equal to the intensity of the monitoring light, the amplitude of the first sampling voltage is equal to the amplitude of the second sampling voltage, and the amplitude difference output by the comparator 371 is equal to 0.

The MCU 31 obtains the amplitude difference output by the comparator 371, and compares the amplitude difference with 0. If the amplitude difference is greater than 0, the MCU 31 increases the voltage applied to the heater 424 to raise the temperature of the first interference arm 412. If the amplitude difference is less than 0, the MCU 31 reduces the voltage applied to the heater 424 to lower the temperature of the first interference arm 412. If the amplitude difference is equal to 0, the voltage applied to the heater 424 at a previous moment is maintained.

In some embodiments, if the amplitude difference output by the comparator 371 is greater than 0, the MCU 31 increases the voltage applied to the heater 424 based on a first step value, and the first step value is greater than 0. For example, the first step value is 0.01V, 0.02V, 0.05V, etc. In addition, if the amplitude difference is greater than 0, the MCU 31 may also select the first step value to increase the voltage applied to the heater 424 according to how much the amplitude difference being greater than 0. For example, in a case where the value of the amplitude difference greater than 0 is large, the MCU 31 selects a larger first step value to increase the voltage applied to the heater 424; in a case where the value of the amplitude difference greater than 0 is small, the MCU 31 selects a smaller first step value to increase the voltage applied to the heater 424. It is assumed that the amplitude difference output by the comparator 371 is 0.5V, the MCU 31 selects a first step value of 0.02V to increase the voltage applied to the heater 424, and in a case where the amplitude difference output by the comparator 371 is 0.1V, the MCU 31 selects the first step value of 0.01V to increase the voltage applied to the heater 424.

In some embodiments, if the amplitude difference output by the comparator 371 is less than 0, the MCU 31 reduces the voltage applied to the heater 424 based on a second step value, and the second step value is greater than 0. For example, the second step value is 0.01V, 0.02V, 0.05V, etc. In addition, if the amplitude difference is less than 0, the MCU 31 may also select the second step value to reduce the voltage applied to the heater 424 according to how much the amplitude difference is less than 0. For example, in a case where the value of the amplitude difference less than 0 is large, the MCU 31 selects a larger second step value to reduce the voltage applied to the heater 424; in a case where the value of the amplitude difference less than 0 is small, the MCU 31 selects a smaller second step value to further decrease the voltage applied to the heater 424. It is assumed that the amplitude difference output by the comparator 371 is −0.5V, the MCU 31 selects the second step value of 0.02V to decrease the voltage applied to the heater 424, and in a case where the amplitude difference output by the comparator 371 is −0.1V, the MCU 31 selects the second step value of 0.01V to decrease the voltage applied to the heater 424.

In a case where the intensity of the output light and the intensity of the monitoring light are not equal, the comparator 371 outputs the high level or low level, or the amplitude difference output by the comparator 371 is not 0. The MCU 31 increases or decreases the voltage applied to the heater 424 according to an output result of the comparator 371, thereby changing the refractive index of the first interference arm 412. The change of the refractive index of the first interference arm 412 changes the phase of the light in the first interference arm 412, thereby reducing the intensity difference between the output light and the monitoring light.

Then, the intensity of the output light and the intensity of the monitoring light are continuously monitored by the first sampling circuit 33 and the second sampling circuit 34. If the intensity of the output light and the intensity of the monitoring light are not equal, the voltage applied to the heater 424 is continuously adjusted according to the output result of the comparator 371.

In this way, the intensity of the output light and the intensity of the monitor light are continuously monitored by the first sampling circuit 33 and the second sampling circuit 34, so as to adjust a heating intensity of the heater 424 until the intensity of the output light is equal to or approximately equal to the intensity of the monitoring light, the voltage applied by the MCU 31 to the heater 424 no longer changes. Once the output result of the comparator 371 received by the MCU 31 shows that the intensity of the output light is not equal to the intensity of the monitoring light, the MCU 31 will adjust the voltage applied to the heater 424, and make the intensity of the output light to be finally equal to or approximately equal to the intensity of the monitoring light.

In the optical module 200 shown in FIG. 11, the MCU 31 transmits the driving signal to the DC bias signal interface of the silicon optical chip 400 according to the difference between the amplitude of the first sampling voltage and the amplitude of the second sampling voltage, so as to control the operation of the heater 424, thereby causing the first sampling voltage and the second sampling voltage to approach to each other. In a case where the difference between the first sampling voltage and the second sampling voltage decreases, the light intensity difference between the output light and the monitoring light is reduced, and the phase difference of the two beams of light respectively located in the first interference arm 412 and the second interference arm 413 is changed, and finally the phase difference of the two beams of light is kept constant. The driving signal includes the driving voltage or driving current.

In some embodiments, the heater 424 may also be provided on the second interference arm 413. If the heater 424 is disposed on the second interference arm 413, a control logic of the MCU 31 is adjusted based on the connection relationships between the first sampling circuit 33 and the comparator 371 and between the second sampling circuit 34 and the comparator 371, so that the phase difference between the two beams of light respectively located in the first interference arm 412 and the second interference arm 413 may be kept constant.

In some embodiments, the circuit board 300 further includes a monitoring photodetector 38. The monitoring photodetector 38 receives the remaining monitor light output from the second output of the sixth beam splitter 423, and monitors an emitted optical power of the optical module 200 according to the remaining monitoring light.

An output of the monitoring photodetector 38 is connected to the monitoring circuit, and the monitoring circuit is connected to the MCU 31. The monitoring photodetector 38 is, for example, the photodiode. The monitoring photodetector 38 is irradiated by the remaining monitor light to generate the photocurrent, and the monitoring circuit converts the photocurrent into the voltage, and transmits the voltage to the MCU 31. The MCU 31 determines the emitted optical power of the optical module 200 according to the received voltage. The monitoring circuit includes at least a resistor which is configured to convert the photocurrent into the voltage.

Figure 13:
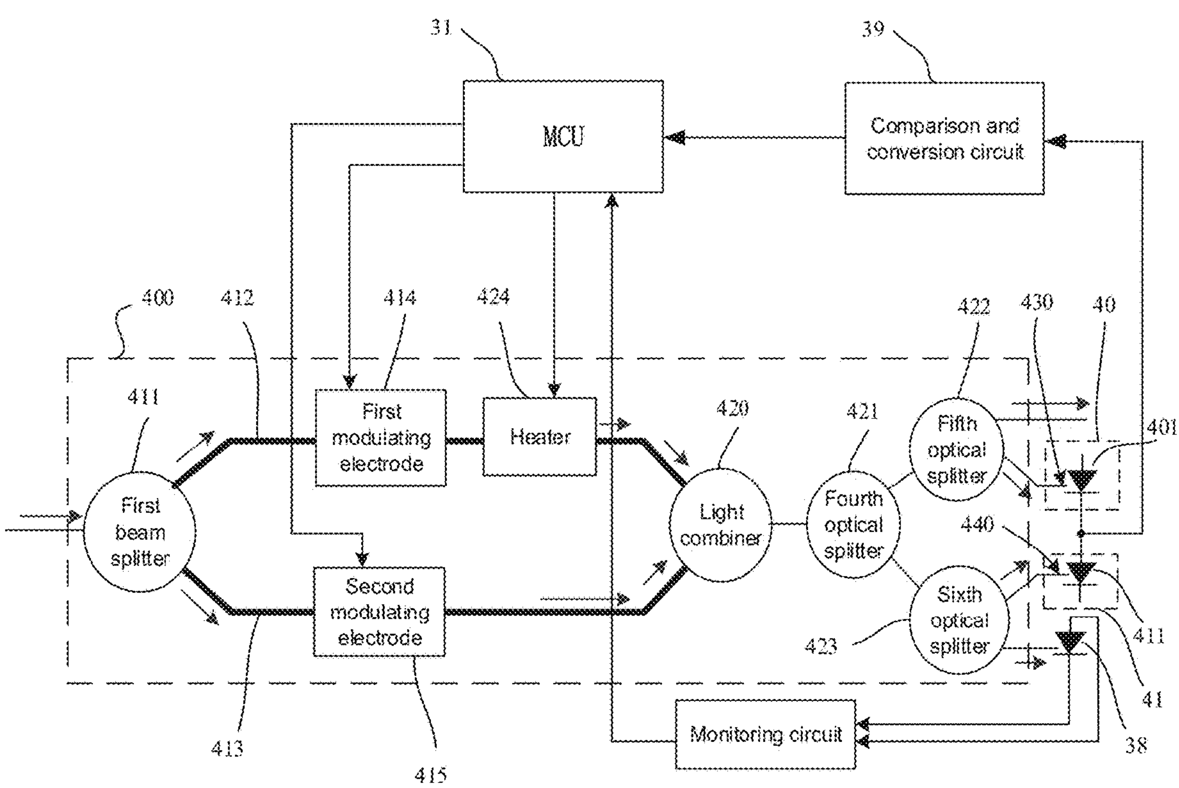
FIG. 13 is a block diagram showing an internal structure of another optical module, in accordance with some embodiments.
Figure 14:
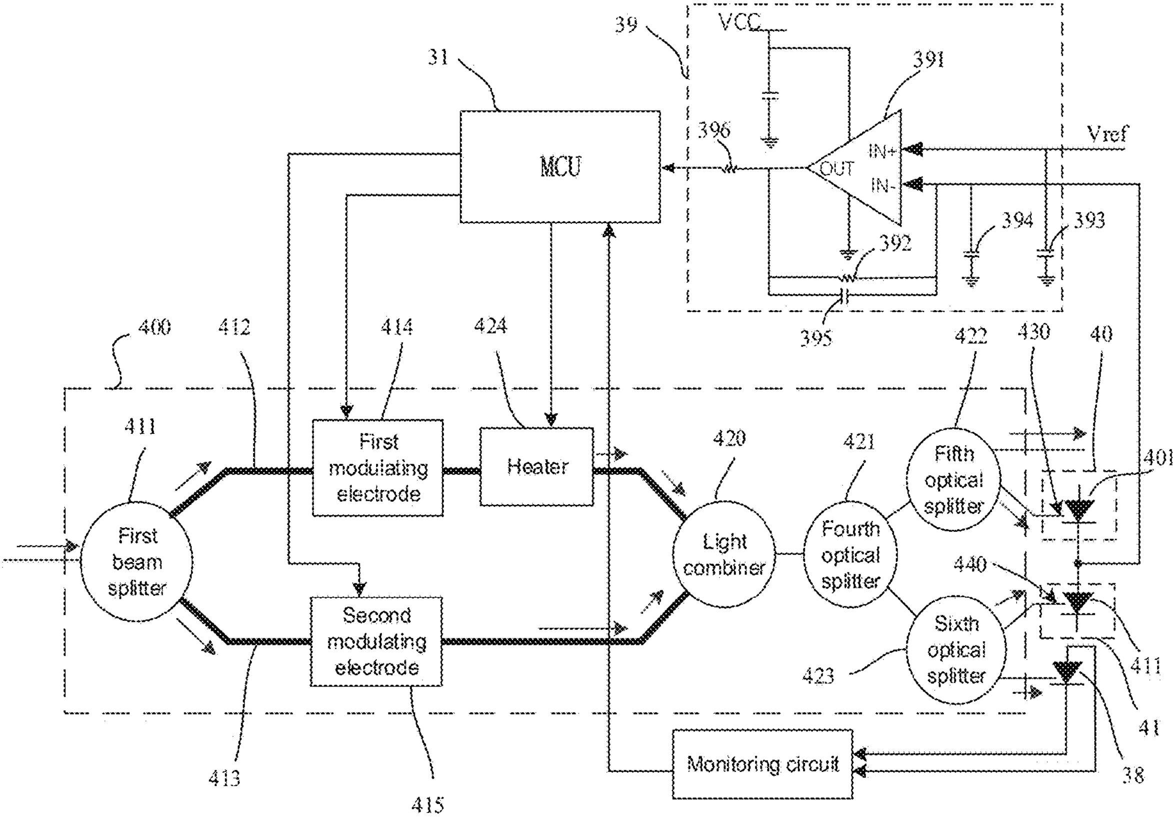
FIG. 14 is a block diagram showing an internal structure of another optical module, in accordance with some embodiments.

It will be noted that, in some embodiments, a first sampling circuit 40 and a second sampling circuit 41 shown in FIGS. 13 and 14 may also be used instead of the first sampling circuit 33 and the second sampling circuit 34 shown in FIGS. 11 and 12. A comparison and conversion circuit 39 shown in FIGS. 13 and 14 may be used instead of the comparison circuit 37 shown in FIGS. 11 and 12.

The first sampling circuit 40 includes a first photodetector 401, and the first photodetector 401 generates a first photocurrent according to the received output light.

The second sampling circuit 41 includes a second photodetector 411, and the second photodetector 411 generates a second photocurrent according to the received monitoring light. The first photocurrent reflects the intensity of the output light, the second photocurrent reflects the intensity of the monitoring light, and then whether a connection terminal of the first sampling circuit 40 and the second sampling circuit 41 is outputting current or inputting current is determined by comparing the magnitude of the first photocurrent and the magnitude of the second photocurrent, and then whether the intensity of the output light is equal to the intensity of the monitoring light may be determined.

In some embodiments, the first photodetector 401 is a first photodiode (PD), and the second photodetector 411 is a second PD.

The first sampling circuit 40 is connected in series with the second sampling circuit 41. For example, a cathode of the first PD is connected to an anode of the second PD, and the connection terminal of the first sampling circuit 40 and the second sampling circuit 41 is located between the cathode of the first PD and the anode of the second PD.

When the first PD and the second PD both receive light, two photocurrents in a same direction are generated. If a photocurrent generated by the first PD is greater than a photocurrent generated by the second PD, the current transmitted at the connection terminal of the first sampling circuit 40 and the second sampling circuit 41 flows into the connection terminal of the first sampling circuit 40 and the second sampling circuit 41, that is, the current flows from the comparison and conversion circuit 39 to the connection terminal of the first sampling circuit 40 and the second sampling circuit 41. If the photocurrent generated by the first PD is less than the photocurrent generated by the second PD, the current transmitted at the connection terminal of the first sampling circuit 40 and the second sampling circuit 41 flows out from the connection terminal of the first sampling circuit 40 and the second sampling circuit 41, that is, the current flows from the connection terminal of the first sampling circuit 40 and the second sampling circuit 41 to the comparison and conversion circuit 39. If the photocurrent generated by the first PD is equal to the photocurrent generated by the second PD, there will be no current at the connection terminal of the first sampling circuit 40 and the second sampling circuit 41.

That is, a direction of the current transmitted at the connection terminal of the first sampling circuit 40 and the second sampling circuit 41 changes with the difference between the intensity of the output light and the intensity of the monitoring light.

The circuit board 300 includes the comparison and conversion circuit 39. The comparison and conversion circuit 39 is configured to convert the current transmitted at the connection terminal of the first sampling circuit 40 and the second sampling circuit 41 into a voltage, thereby the MCU 31 adjusts the driving signal applied to the heater 424 according to the voltage.

As shown in FIG. 14, the comparison and conversion circuit 39 includes an operational amplifier 391 and an auxiliary resistor 392.

An inverting input of the operational amplifier 391 is connected to the connection terminal of the first sampling circuit 40 and the second sampling circuit 41, a non-inverting input of the operational amplifier 391 is configured to provide a reference voltage Vref, and an output of the operational amplifier 391 is connected to the input of the MCU 31. An end of the first resistor 392 is connected to the inverting input of the operational amplifier 391, and another end of the first resistor 392 is connected to the output of the operational amplifier 391.

The inverting input of the operational amplifier 391 receives the current being output from or input into the connection terminal of the first sampling circuit 40 and the second sampling circuit 41. The non-inverting input of the operational amplifier 391 is connected to a power supply pin on the circuit board 300, so as to receive the reference voltage Vref. The reference voltage Vref may be selected according to actual situations of the optical module 200, such as 1V, 0.9V, or 0.8V.

The operational amplifier 391 and the auxiliary resistor 392 are combined to convert the current transmitted at the connection terminal of the first sampling circuit 40 and the second sampling circuit 41 into the voltage, and a resistance value of the auxiliary resistor 392 may control an amplification factor of the voltage when the comparison and conversion circuit 39 converts the current transmitted at the connection terminal of the first sampling circuit 40 and the second sampling circuit 41 into the voltage. The resistance value of the auxiliary resistor 392 may be selected according to a value of the reference voltage Vref and a value of the current transmitted at the connection terminal of the first sampling circuit 40 and the second sampling circuit 41. If the selected reference voltage Vref is relatively large and the current transmitted at the connection terminal of the first sampling circuit 40 and the second sampling circuit 41 is relatively small, a resistor with a relatively large resistance is selected as the auxiliary resistor 392.

It is assumed that the resistance of the auxiliary resistor is R and the reference voltage Vref is 1V. If the current I transmitted at the connection terminal of the first sampling circuit 40 and the second sampling circuit 41 flows from the comparison and conversion circuit 39 to the connection terminal of the first sampling circuit 40 and the second sampling circuit 41, the output voltage at the output of the operational amplifier 391 satisfies the formula of $V0=1V+I\times R$. If the current I transmitted at the connection terminal of the first sampling circuit 40 and the second sampling circuit 41 flows from the connection terminal of the first sampling circuit 40 and the second sampling circuit 41 to the comparison and conversion circuit 39, the output voltage at the output of the operational amplifier 391 satisfies the formula of $V0=1V-I\times R$. If the current transmitted at the connection terminal of the first sampling circuit 40 and the second sampling circuit 41 is 0, the output voltage at the output of the operational amplifier 391 satisfies the formula of $V0=1V$.

The MCU 31 adjusts the driving voltage applied to the heater 424 according to the voltage output by the operational amplifier 391, such as increasing or decreasing the driving voltage applied to the heater 424.

In some embodiments, a standard voltage is set in the MCU 31. The MCU 31 compares the voltage output by the operational amplifier 391 with the standard voltage, and if the voltage output by the operational amplifier 391 is greater than the standard voltage, the voltage applied to the heater 424 is increased. If the voltage output by the operational amplifier 391 is less than the standard voltage, the voltage applied to the heater 424 is reduced. If the voltage output by the operational amplifier 391 is equal to the standard voltage, the voltage applied to the heater 424 at a previous moment is maintained.

In some embodiments, if the voltage output by the operational amplifier 391 is greater than the standard voltage, the voltage applied to the heater 424 is increased based on a third step value, and the third step value is greater than 0. For example, the third step value is 0.01V, 0.02V, 0.05V, etc. In addition, if the voltage output by the operational amplifier 391 is greater than the standard voltage, the third step value for increasing the voltage applied to the heater 424 may also be selected according to how much the voltage output by the operational amplifier 391 being greater than the standard voltage. For example, in a case where the value of the voltage output by the operational amplifier 391 greater than the standard voltage is large, a larger third step value is selected to increase the voltage applied to the heater 424. In a case where the value of the voltage output by the operational amplifier 391 greater than the standard voltage is small, the smaller third step value is selected to increase the voltage applied to the heater 424. It is assumed that the voltage V0 output by the operational amplifier 391 is 1.5V and the standard voltage preset by the MCU 31 is 1V, the third step value of 0.02V is selected to increase the voltage applied to the heater 424. In a case where the voltage V0 output by the operational amplifier 391 is 1.1V, the third step value of 0.01V is selected to increase the voltage applied to the heater 424.

In some embodiments, if the voltage output by the operational amplifier 391 is less than the standard voltage, the voltage applied to the heater 424 is reduced based on a fourth step value, and the fourth step value is greater than 0. For example, the fourth step value is 0.01V, 0.02V, 0.05V, etc. In addition, if the voltage output by the operational amplifier 391 is less than the standard voltage, the fourth step value for decreasing the voltage applied to the heater 424 may also be selected according to how much the voltage output by the operational amplifier 391 being less than the standard voltage. For example, in a case where the value of the voltage output by the operational amplifier 391 less than the standard voltage is large, a larger fourth step value is selected to reduce the voltage applied to the heater 424. In a case where the voltage output by the operational amplifier 391 less than the standard voltage is small, a smaller fourth step value is selected to reduce the voltage applied to the heater 424. It is assumed that the voltage V0 output by the operational amplifier 391 is 0.7V and the standard voltage preset by the MCU 31 is 1V, the fourth step value of 0.02V is selected to reduce the voltage applied to the heater 424. In a case where the voltage V0 output by the operational amplifier 391 is 0.9V, the fourth step value of 0.01V is selected to reduce the voltage applied to the heater 424.

In a case where the intensity of the output light and the intensity of the monitoring light are not equal, the current transmitted at the connection terminal of the first sampling circuit 40 and the second sampling circuit 41 is not 0. The comparison and conversion circuit 39 inputs the voltage to the MCU 31 according to the reference voltage Vref input thereto and a direction and magnitude of the current transmitted at the connection terminal of the first sampling circuit 40 and the second sampling circuit 41. The MCU 31 compares the received voltage with the preset standard voltage, and increases or decreases the voltage applied to the heater 424 according to the comparison result. The heater 424 changes the heating intensity under an adjusted voltage, thereby changing the refractive index of the first interference arm 412. The change of the refractive index of the first interference arm 412 changes the phase of the light in the first interference arm 412, thereby reducing the intensity difference between the output light and the monitoring light.

Then, the first sampling circuit 40 and the second sampling circuit 41 continuously monitor the intensity of the output light and the intensity of the monitoring light. If the intensity of the output light is not equal to the intensity of the monitoring light, the voltage applied to the heater 424 is continuously adjusted according to the output result of the operational amplifier 391.

In this way, the first sampling circuit 40 and the second sampling circuit 41 continuously monitor the intensity of the output light and the intensity of the monitoring light, so as to adjust the heating intensity of the heater 424 until the intensity of the output light is equal to or approximately equal to the intensity of the monitoring light, the voltage applied by the MCU 31 to the heater 424 no longer changes. Once the voltage received by the MCU 31 is not equal to the reference voltage, the MCU 31 will adjust the voltage applied to the heater 424, and make the intensity of the output light to be finally equal to or approximately equal to the intensity of the monitoring light.

In some embodiments, the comparison and conversion circuit 39 further includes a first auxiliary capacitor 393 and a second auxiliary capacitor 394. An end of the first auxiliary capacitor 393 is connected to the non-inverting input of the operational amplifier 391 and another end thereof is grounded. An end of the second auxiliary capacitor 394 is connected to the inverting input of the operational amplifier 391 and another end thereof is grounded. The first auxiliary capacitor 393 is configured to filter the non-inverting input of the operational amplifier 391, and the second auxiliary capacitor 394 is configured to filter the inverting input of the operational amplifier 391, so as to ensure a purity of the signals input to the operational amplifier 391.

In some embodiments, the comparison and conversion circuit 39 further includes a third auxiliary capacitor 395. An end of the third auxiliary capacitor is connected to the inverting input of the operational amplifier 391, and another end of the third capacitor is connected to the output of the operational amplifier 391. The third auxiliary capacitor is configured to filter an operation of the operational amplifier 391 to ensure the purity of the operation of the operational amplifier 391.

In some embodiments, the comparison and conversion circuit 39 further includes a second auxiliary resistor 396. The second auxiliary resistor 396 is connected in series between the output of the operational amplifier 391 and the input of the MCU 31. The second auxiliary resistor 396 facilitates improving an accuracy of the voltage input from the comparison and conversion circuit 39 to the MCU 31.

According to one aspect, the circuits, disposed on, associated with, or provided by the circuit board 300, other than the first sampling circuit 33 and the second sampling circuit 34, may be defined as a processing circuit. The processing circuit may include, but not limited to, for example, the MCU 31, the locking circuit 32, the comparison circuit 37, and/or the comparison and conversion circuit 39.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the scope of the present disclosure shall be subject to the protection scope of the claims.

Those skilled in the art will understand that the scope of disclosure involved in the present disclosure is not limited to the technical solutions formed by the specific combinations of the above technical features, and will also cover other technical solutions formed by any combination of the above technical features or their equivalent features without departing from the disclosed concept. For example, the technical solution formed by replacing the above features with technical features disclosed in some embodiments (but not limited to) having similar functions.

What is claimed is:

1. An optical module, comprising:

a shell;

a circuit board disposed in the shell;

a light source electrically connected to the circuit board and configured to emit light; and a silicon optical chip disposed on the circuit board and electrically connected to the circuit board;

wherein the silicon optical chip includes a modulator configured to receive light emitted by the light source and modulate the light into an optical signal, so as to output the optical signal to an outside of the optical module;

wherein the circuit board includes:

a first sampling circuit optically connected to a first monitoring optical port of the silicon optical chip and configured to receive an optical signal transmitted through the first monitoring optical port and generate a first sampling signal according to the optical signal; and a second sampling circuit optically connected to a second monitoring optical port of the silicon optical chip and configured to receive an optical signal transmitted through the second monitoring optical port and generate a second sampling signal according to the optical signal;

wherein the first sampling circuit is connected in series with the second sampling circuit, the first sampling circuit includes a first photodetector configured to generate a first photocurrent according to the optical signal received from the first monitoring optical port, the second sampling circuit includes a second photodetector configured to generate a second photocurrent according to the optical signal received from the second monitoring optical port, and a connection terminal of the first sampling circuit and the second sampling circuit is located between the first photodetector and the second photodetector; and the circuit board further includes:

a processing circuit connected to the first sampling circuit and the second sampling circuit and configured to receive a signal transmitted at the connection terminal of the first sampling circuit and the second sampling circuit and send a driving signal to the modulator according to the signal transmitted at the connection terminal of the first sampling circuit and the second sampling circuit, so as to control heating of the modulator, wherein the processing circuit comprises:

a comparison and conversion circuit electrically connected to the connection terminal of the first sampling circuit and the second sampling circuit and configured to convert a current transmitted at the connection terminal of the first sampling circuit and the second sampling circuit into a voltage; and a processor electrically connected to the comparison and conversion circuit and configured to receive the voltage and adjust the driving signal applied to the modulator according to the voltage, wherein the comparison and conversion circuit comprises:

an operational amplifier, an inverting input of the operational amplifier being connected to the connection terminal of the first sampling circuit and the second sampling circuit, a non-inverting input of the operational amplifier being connected to a reference voltage, and an output of the operational amplifier being configured to output the voltage according to a flow direction of the current at the connection terminal of the first sampling circuit and the second sampling circuit, wherein the voltage being a sum or difference of the reference voltage and a voltage of an auxiliary resistor; and the auxiliary resistor, an end of the auxiliary resistor being connected to the inverting input of the operational amplifier, another end of the auxiliary resistor is connected to an output of the operational amplifier, and the auxiliary resistor being configured to convert the current at the connection terminal of the first sampling circuit and the second sampling circuit into the voltage of the auxiliary resistor; and the processor is connected to the output of the operational amplifier, and is configured to receive the voltage output by the operational amplifier; and the processor is further configured to compare the voltage output by the operational amplifier with a preset standard voltage, and perform one of the following operations:

increasing the driving signal sent to the modulator in response to the voltage output by the operational amplifier being greater than the standard voltage;

reducing the driving signal sent to the modulator in response to the voltage output by the operational amplifier being less than the standard voltage; and maintaining the driving signal sent to the modulator at a previous moment in response to the voltage output by the operational amplifier being equal to the standard voltage.

2. The optical module according to claim 1, wherein the comparison and conversion circuit is configured to perform one of the following operations:

the current transmitted at the connection terminal of the first sampling circuit and the second sampling circuit flowing from the comparison and conversion circuit to the connection terminal of the first sampling circuit and the second sampling circuit and the voltage output at the output of the operational amplifier satisfying a formula of $V0=Vref+I\times R$ in response to the first photocurrent generated by the first photodetector being greater than the second photocurrent generated by the second photodetector;

the current transmitted at the connection terminal of the first sampling circuit and the second sampling circuit flowing from the connection terminal of the first sampling circuit and the second sampling circuit to the comparison and conversion circuit and the voltage output at the output of the operational amplifier satisfying a formula of $V0=Vref-I\times R$ in response to the first photocurrent generated by the first photodetector being less than the second photocurrent generated by the second photodetector; and the current transmitted at the connection terminal of the first sampling circuit and the second sampling circuit being 0 and the output voltage at the voltage output of the operational amplifier satisfying a formula of $V0=Vref$ in response to the first photocurrent generated by the first photodetector being equal to the second photocurrent generated by the second photodetector;

wherein V0 is a value of the voltage output at the output of the operational amplifier, Vref is a value of the reference voltage, I is a value of the current transmitted at the connection terminal of the first sampling circuit, and R is a resistance of the auxiliary resistor.

3. The optical module according to claim 2, wherein the reference voltage is 0.8V~1V.

4. The optical module according to claim 2, wherein the processor is further configured to perform one of the following operations:

increasing a voltage applied to the modulator based on a third step value in response to the voltage output by the operational amplifier being greater than the standard voltage, wherein the third step value is greater than 0; and reducing a voltage applied to the modulator based on a fourth step value in response to the voltage output by the operational amplifier being less than the standard voltage, wherein the fourth step value is greater than 0.

5. The optical module according to claim 4 wherein the third step value is 0.01V~0.05V, and the fourth step value is 0.01V~0.05V.

6. The optical module according to claim 2, wherein the circuit board further includes at least one of the followings:

a first auxiliary capacitor, an end of the first auxiliary capacitor being connected to the non-inverting input of the operational amplifier, and another end of the first auxiliary capacitor being grounded;

a second auxiliary capacitor, an end of the second auxiliary capacitor being connected to the inverting input of the operational amplifier, and another end of the second auxiliary capacitor being grounded;

a third auxiliary capacitor, an end of the third auxiliary capacitor being connected to the inverting input of the operational amplifier, and another end of the third auxiliary capacitor being connected to the output of the operational amplifier; and a second auxiliary resistor connected in series between the output of the operational amplifier and an input of the processor.

7. The optical module according to claim 1, wherein the first photodetector is a first photodiode, and the second photodetector is a second photodiode.

8. The optical module according to claim 7, wherein a cathode of the first photodiode is connected to an anode of the second photodiode, and the connection terminal of the first sampling circuit and the second sampling circuit is located between the cathode of the first photodiode and the anode of the second photodiode.

9. An optical module, comprising:

a shell;

a circuit board disposed in the shell;

a light source electrically connected to the circuit board and configured to emit light; and a silicon optical chip disposed on the circuit board and electrically connected to the circuit board;

wherein the silicon optical chip includes a modulator configured to receive light emitted by the light source and modulate the light into an optical signal, so as to output the optical signal to an outside of the optical module;

wherein the circuit board comprises:

a first sampling circuit optically connected to a first monitoring optical port of the silicon optical chip and configured to receive an optical signal transmitted through the first monitoring optical port and generate a first sampling signal according to the optical signal; and a second sampling circuit optically connected to a second monitoring optical port of the silicon optical chip and configured to receive an optical signal transmitted through the second monitoring optical port and generate a second sampling signal according to the optical signal;

wherein the first sampling circuit is connected in series with the second sampling circuit, the first sampling circuit includes a first photodetector configured to generate a first photocurrent according to the optical signal received from the first monitoring optical port, the second sampling circuit includes a second photodetector configured to generate a second photocurrent according to the optical signal received from the second monitoring optical port, and a connection terminal of the first sampling circuit and the second sampling circuit is located between the first photodetector and the second photodetector; and the circuit board further comprises:

a processing circuit connected to the first sampling circuit and the second sampling circuit and configured to receive a signal transmitted at the connection terminal of the first sampling circuit and the second sampling circuit and send a driving signal to the modulator according to the signal transmitted at the connection terminal of the first sampling circuit and the second sampling circuit, so as to change phase of the light in the modulator, wherein the processing circuit comprises:

a comparison and conversion circuit electrically connected to the connection terminal of the first sampling circuit and the second sampling circuit and configured to convert a current transmitted at the connection terminal of the first sampling circuit and the second sampling circuit into a first voltage; and a processor electrically connected to the comparison and conversion circuit and configured to receive the first voltage and adjust the driving signal applied to the modulator according to the first voltage, wherein the comparison and conversion circuit comprises:

an operational amplifier, an inverting input of the operational amplifier being connected to the connection terminal of the first sampling circuit and the second sampling circuit, a non-inverting input of the operational amplifier being connected to a reference voltage, and an output of the operational amplifier being configured to output the first voltage according to a flow direction of the current at the connection terminal of the first sampling circuit and the second sampling circuit, wherein the first voltage being a sum or difference of the reference voltage and a voltage of an auxiliary resistor; and the auxiliary resistor, an end of the auxiliary resistor being connected to the inverting input of the operational amplifier, another end of the auxiliary resistor is connected to an output of the operational amplifier, and the auxiliary resistor being configured to convert the current at the connection terminal of the first sampling circuit and the second sampling circuit into the voltage of the auxiliary resistor; and the processor is connected to the output of the operational amplifier, and is configured to receive the first voltage output by the operational amplifier; and the processor is further configured to compare the voltage output by the operational amplifier with a preset standard voltage, and perform one of the following operations:

increasing the driving signal sent to the phase modulator in response to the first voltage output by the operational amplifier being greater than the standard voltage;

reducing the driving signal sent to the phase modulator in response to the first voltage output by the operational amplifier being less than the standard voltage; and maintaining the driving signal sent to the phase modulator at a previous moment in response to the first voltage output by the operational amplifier being equal to the standard voltage.

10. The optical module according to claim 9, wherein the modulator comprises:

a first beam splitter, an input thereof being optically connected to an input optical port of the silicon optical chip, and the first beam splitter being configured to receive the light from the light source, and split the light into a first beam of light and a second beam of light;

a first interference arm, an input thereof being connected to a first output of the first beam splitter, and the first interference arm being configured to receive the first beam of light from the first beam splitter;

a second interference arm, an input thereof being connected to a second output of the first beam splitter, and the second interference arm being configured to receive the second beam of light from the first beam splitter;

a first modulating electrode disposed on the first interference arm and electrically connected to the processing circuit, and configured to modulate the first beam of light in the first interference arm to obtain a first optical signal;

a second modulating electrode disposed on the second interference arm and electrically connected to the processing circuit, and configured to modulate the second beam of light in the second interference arm to obtain a second optical signal; and an light combiner, a first input of the light combiner being connected to an output of the first interference arm, a second input of the light combiner being connected to an output of the second interference arm, and an output of the light combiner being optically connected to an output optical port of the silicon optical chip, the light combiner being configured to combine the first optical signal from the first interference arm and the second optical signal from the second interference arm to obtain the optical signal.

11. The optical module according to claim 10, wherein the modulator further includes:

a second beam splitter, an input of the second beam splitter being optically connected to the output of the light combiner, and the second beam splitter being configured to receive the optical signal from the light combiner and split the optical signal into first output light and second output light;

a third beam splitter, an input of the third beam splitter being optically connected to a first output of the second beam splitter, and a first output of the third beam splitter being optically connected to the first monitoring optical port, a second output of the third beam splitter being optically connected to the output optical port of the silicon optical chip, and the third beam splitter being configured to split away a part of the first output light to the first monitoring optical port according to a third predetermined ratio, and output remaining first output light to the output optical port of the silicon optical chip;

a fourth beam splitter, an input of the fourth beam splitter being optically connected to a second output of the second beam splitter, and a first output of the fourth beam splitter being optically connected to the second monitoring optical port, and the fourth beam splitter being configured to split away a part of the second output light to the second monitoring optical port according to a fourth predetermined ratio; and a phase modulator disposed on one of the first interference arm and the second interference arm, and electrically connected to the processing circuit, and the heater being configured to adjust a phase of light of the one of the first interference arm and the second interference arm according to the driving signal sent by the processing circuit.

12. The optical module according to claim 11, wherein the circuit board further includes:

a monitoring photodetector optically connected to a second output of the fourth beam splitter and configured to receive remaining second output light from the second output of the fourth beam splitter and generate a third photocurrent to monitor an emitted optical power of the optical module.

13. The optical module according to claim 12, wherein the heater is disposed on the first interference arm.

14. The optical module according to claim 9, wherein the circuit board further includes:

a monitoring circuit electrically connected to an output of the monitoring photodetector and configured to receive the third photocurrent generated by the monitoring photodetector and convert the third photocurrent into a second voltage; and the processor is further electrically connected to the monitoring circuit, and is further configured to receive the second voltage and determine the emitted optical power of the optical module according to the second voltage.

15. The optical module according to claim 9, wherein the monitoring circuit includes a resistor, an end of the resistor is connected to the output of the monitoring photodetector, another end of the resistor is connected to the processor.

16. The optical module according to claim 9, wherein the processor is further configured to perform one of the following operations:

increasing a voltage applied to the phase modulator based on a third step value in response to the voltage output by the operational amplifier being greater than the standard voltage, wherein the third step value is greater than 0; and reducing a voltage applied to the phase modulator based on a fourth step value in response to the voltage output by the operational amplifier being less than the standard voltage, wherein the fourth step value is greater than 0.

17. The optical module according to claim 11, wherein the phase modulator is a heater, the heater is configured to adjust a temperature of the one of the first interference arm and the second interference arm according to the driving signal sent by the processing circuit to change a refractive index of the one of the first interference arm and the second interference arm, so as to adjust the phase of light of the one of the first interference arm and the second interference arm.

* * * * *